United States Patent
Sproule et al.

(10) Patent No.: US 12,460,464 B2
(45) Date of Patent: Nov. 4, 2025

(54) BRAKE FOR VEHICLE CLOSURE ACTUATOR

(71) Applicant: STRATTEC POWER ACCESS LLC, Auburn Hills, MI (US)

(72) Inventors: Gregory Sproule, Linden, MI (US); Kimpon Ngem, Grant Township, MI (US); Paul Crociata, Farmington Hills, MI (US); Steven Buell, Auburn Hills, MI (US); Howard Kuhlman, Rochester Hills, MI (US)

(73) Assignee: STRATTEC POWER ACCESS LLC, Auburn Hills, MI (US)

( * ) Notice: Subject to any disclaimer, the term of this patent is extended or adjusted under 35 U.S.C. 154(b) by 430 days.

(21) Appl. No.: 18/073,773

(22) Filed: Dec. 2, 2022

(65) Prior Publication Data
US 2023/0203869 A1   Jun. 29, 2023

Related U.S. Application Data

(60) Provisional application No. 63/293,466, filed on Dec. 23, 2021.

(51) Int. Cl.
*E05F 3/16* (2006.01)
*E05F 5/02* (2006.01)
(Continued)

(52) U.S. Cl.
CPC ............... *E05F 3/16* (2013.01); *E05F 5/025* (2013.01); *E05F 15/41* (2015.01); *E05F 15/77* (2015.01);
(Continued)

(58) Field of Classification Search
CPC ..... E05F 15/611; E05F 15/614; E05F 15/632; E05F 15/643; E05F 15/649; E05F 15/655;
(Continued)

(56) References Cited

U.S. PATENT DOCUMENTS 1,425,305 A   8/1922   White
1,503,446 A   7/1924   Hedglon
(Continued)

FOREIGN PATENT DOCUMENTS

GB   2551210 A   12/2017
JP   S6380330 U   5/1988
(Continued)

OTHER PUBLICATIONS

Search Report issued from the European Patent Office for related Application No. 20275078.2 dated Sep. 28, 2020 (5 Pages).
(Continued)

*Primary Examiner* — Daniel J Troy
*Assistant Examiner* — Susan M. Heschel
(74) *Attorney, Agent, or Firm* — Michael Best & Friedrich LLP

(57) ABSTRACT

A power closure actuator for powering a movable closure includes a shaft situated between an electric motor and an output member. A brake device along the shaft is configured for actuation via an electric brake actuator to apply braking. An active brake clamp is movable by the electric brake actuator. An axially floating rotor is rotatable with the shaft and has a first axial side facing the active brake clamp a second axial side providing a second braking surface. A passive backing brake clamp is positioned adjacent the second braking surface. The axially floating rotor is biased away from the passive backing brake clamp by a first biasing member. Deflection of the first biasing member coupled with axial movement of the active brake clamp and the axially floating rotor enables braking by pinching action of the axially floating rotor between the active brake clamp and the passive backing brake clamp.

21 Claims, 17 Drawing Sheets

(51) Int. Cl.
 *E05F 15/41* (2015.01)
 *E05F 15/77* (2015.01)
 *E05F 15/63* (2015.01)

(52) U.S. Cl.
 CPC .......... *E05F 15/63* (2015.01); *E05Y 2201/21* (2013.01); *E05Y 2201/216* (2013.01); *E05Y 2201/236* (2013.01); *E05Y 2201/246* (2013.01); *E05Y 2201/248* (2013.01); *E05Y 2201/264* (2013.01); *E05Y 2201/408* (2013.01); *E05Y 2201/41* (2013.01); *E05Y 2201/474* (2013.01); *E05Y 2201/624* (2013.01); *E05Y 2201/704* (2013.01); *E05Y 2201/706* (2013.01); *E05Y 2400/326* (2013.01); *E05Y 2400/44* (2013.01); *E05Y 2400/522* (2013.01); *E05Y 2400/86* (2013.01); *E05Y 2600/45* (2013.01); *E05Y 2600/46* (2013.01)

(58) Field of Classification Search
 CPC .......... E05F 15/662; E05F 5/025; E05F 3/16; E05Y 2201/236
 See application file for complete search history.

(56) References Cited

U.S. PATENT DOCUMENTS

| | | | |
|---|---|---|---|
| 1,731,064 A | 10/1929 | Spase | |
| 2,230,756 A | 2/1941 | Lohry | |
| 2,333,980 A | 11/1943 | Branson | |
| 2,429,561 A | 10/1947 | Miller | |
| 2,727,372 A | 12/1955 | Haerther | |
| 2,738,864 A | 3/1956 | Becker | |
| 2,901,899 A | 9/1959 | Berky | |
| 2,943,466 A | 7/1960 | Elliott | |
| 3,025,686 A | 3/1962 | Lewis | |
| 3,090,213 A | 5/1963 | Lindgren | |
| 3,214,773 A | 11/1965 | Benjamin et al. | |
| 3,534,630 A | 10/1970 | Schwerdhofer | |
| 3,585,817 A | 6/1971 | Mccafferty, Jr. et al. | |
| 4,141,441 A | 2/1979 | Fukatani | |
| 4,474,080 A | 10/1984 | Day | |
| 4,921,083 A | 5/1990 | Etscheidt et al. | |
| 4,934,502 A | 6/1990 | Horsch | |
| 5,040,331 A | 8/1991 | Merendino et al. | |
| 5,086,898 A | 2/1992 | Patton et al. | |
| 5,180,042 A | 1/1993 | Ogiso | |
| 5,688,176 A | 11/1997 | Heidenreich et al. | |
| 6,398,288 B1 | 6/2002 | Yuge | |
| 7,063,373 B2 * | 6/2006 | Chikata | E05F 15/63 49/140 |
| 7,140,150 B2 | 11/2006 | Sakai et al. | |
| 7,644,540 B2 | 1/2010 | Ichinose | |
| 7,766,750 B2 | 8/2010 | Campbell et al. | |
| 8,033,374 B2 | 10/2011 | Gunton | |
| 8,066,210 B2 | 11/2011 | Eriksson et al. | |
| 8,075,439 B2 | 12/2011 | Ta et al. | |
| 8,715,092 B2 | 5/2014 | Heidenreich et al. | |
| 8,875,442 B2 * | 11/2014 | Sohn | E05F 15/611 49/340 |
| 9,074,635 B2 | 7/2015 | Rasmussen | |
| 9,394,970 B2 | 7/2016 | Casamenti et al. | |
| 9,732,807 B1 | 8/2017 | Logan et al. | |
| 10,030,714 B2 | 7/2018 | Maghsoodi et al. | |
| 10,184,286 B2 | 1/2019 | Kennedy et al. | |
| 10,378,262 B2 | 8/2019 | Yulkowski | |
| 10,378,263 B2 | 8/2019 | Podkopayev | |
| 10,392,849 B2 * | 8/2019 | Xiao | E05F 15/611 |
| 10,495,155 B2 | 12/2019 | Kobayashi et al. | |
| 11,421,465 B2 | 8/2022 | Sproule et al. | |
| 2004/0046418 A1 | 3/2004 | Chikata et al. | |
| 2005/0082134 A1 | 4/2005 | Bigi | |
| 2011/0314739 A1 | 12/2011 | Kaburaki | |
| 2014/0338480 A1 | 11/2014 | Wu | |
| 2016/0010379 A1 | 1/2016 | Sauerwein et al. | |
| 2016/0115725 A1 | 4/2016 | Yulkowski | |
| 2017/0030132 A1 * | 2/2017 | Elie | E05F 15/611 |
| 2017/0335895 A1 | 11/2017 | Kobayashi et al. | |
| 2018/0223583 A1 | 8/2018 | Podkopayev | |
| 2019/0009406 A1 | 1/2019 | Marttinen et al. | |
| 2019/0112859 A1 | 4/2019 | Cumbo | |
| 2019/0145137 A1 | 5/2019 | Ueno | |
| 2020/0165857 A1 | 5/2020 | Yulkowski | |
| 2021/0158935 A1 | 5/2021 | Ravishankar et al. | |

FOREIGN PATENT DOCUMENTS

| | | |
|---|---|---|
| JP | 2005226296 A | 8/2005 |
| KR | 20110008674 A | 1/2011 |

OTHER PUBLICATIONS

Communication issued from the European Patent Office forrelated Application No. 20275078.2 dated Feb. 9, 2022 (5 Pages).

* cited by examiner

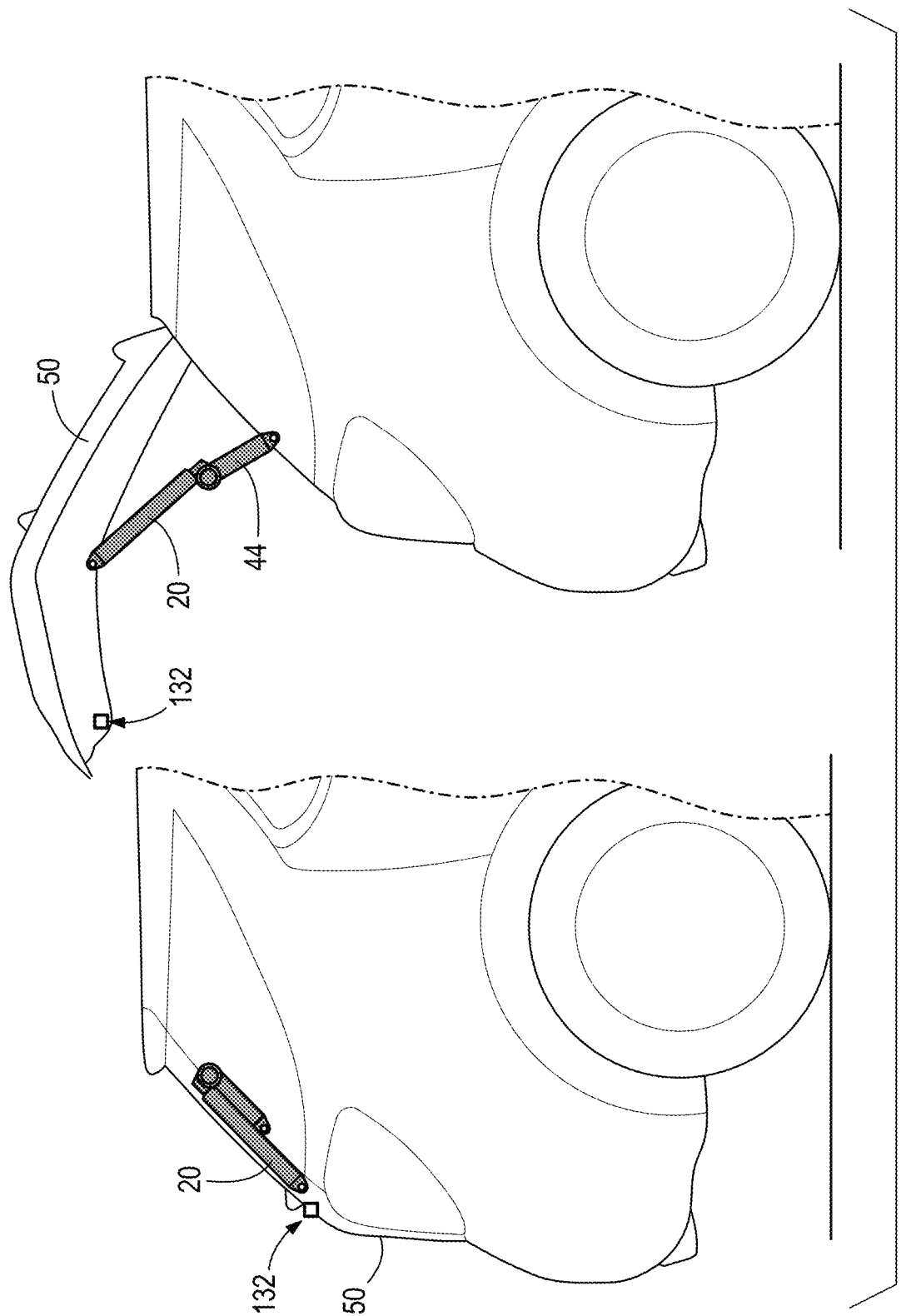

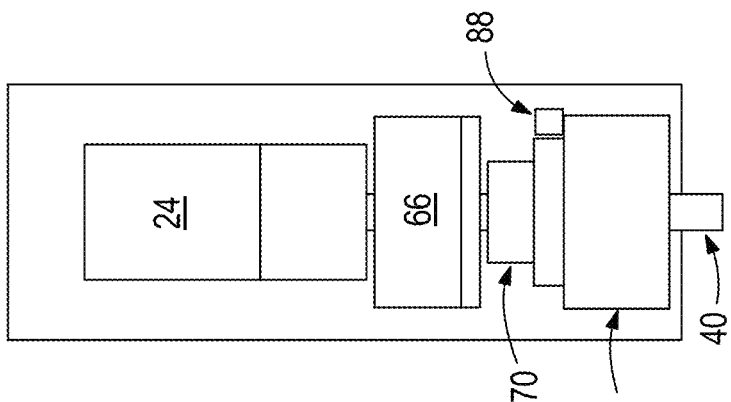
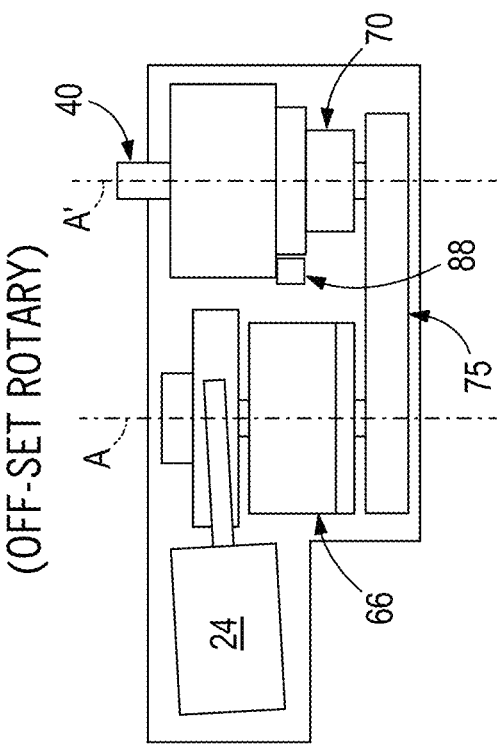
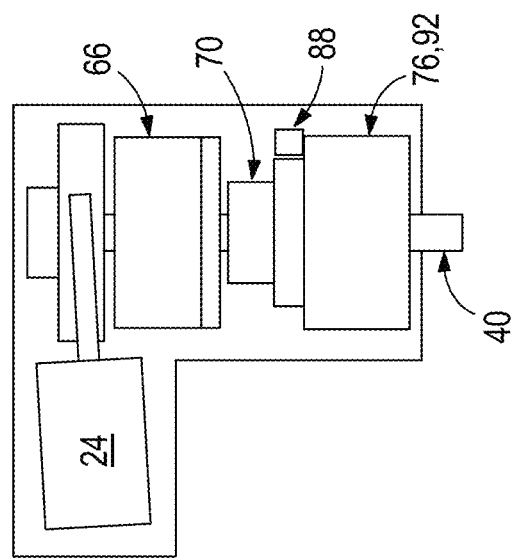
FIG. 4C
FIG. 4B
FIG. 4A

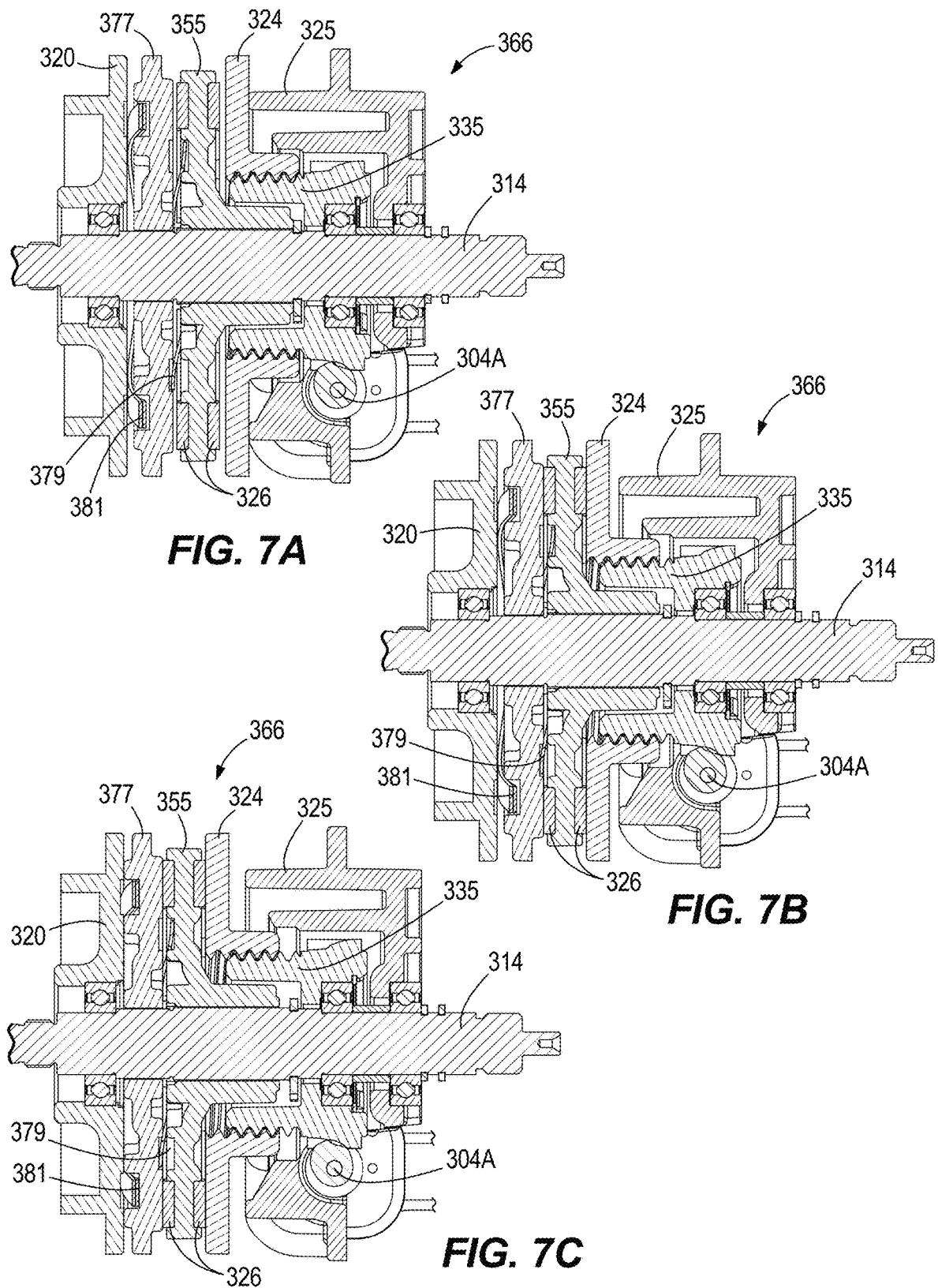

BRAKE FOR VEHICLE CLOSURE ACTUATOR

CROSS-REFERENCE TO RELATED APPLICATIONS

This application claims priority to U.S. Provisional Patent Application No. 63/293,466, filed on Dec. 23, 2021, the entire contents of which are incorporated by reference herein.

BACKGROUND

The invention relates to powered vehicle closures and particularly actuators provided for opening and/or closing a closure in an automotive application including, but not limited to, truck end gates or "tailgates," vehicular rear hatches, lift gates, trunks, and side entry doors.

SUMMARY

In one aspect, the invention provides a power closure actuator for powering a movable closure. The power closure actuator includes an output member configured to drive movement of the movable closure, and an electric motor coupled through at least one gear reduction stage to drive the output member. A shaft is situated between the electric motor and the output member, the shaft configured to selectively transmit power from the electric motor to the output member. A brake device is situated along the shaft and configured for actuation via an electric brake actuator to apply braking force to the shaft, the brake device including an active brake clamp movable along an axis of the shaft by the electric brake actuator. The brake device further includes an axially floating rotor configured for rotation with the shaft, the axially floating rotor having a first axial side facing the active brake clamp and providing a first braking surface for frictional contact therewith, and the axially floating rotor having a second axial side providing a second braking surface. The brake device further includes a passive backing brake clamp positioned adjacent the second axial side of the axially floating rotor for frictional contact with the second braking surface thereof, wherein the axially floating rotor is biased away from the passive backing brake clamp by a first biasing member. Deflection of the first biasing member coupled with axial movement of the active brake clamp and the axially floating rotor is configured to enable application of the braking force by pinching action of the axially floating rotor between the active brake clamp and the passive backing brake clamp.

In another aspect, the invention provides a power closure actuator for powering a movable closure. An output member of the power closure actuator is configured to drive movement of the movable closure. An electric motor is coupled through at least one gear reduction stage to drive the output member. A shaft is situated between the electric motor and the output member, and the shaft is configured to selectively transmit power from the electric motor to the output member. An integrated brake-clutch unit includes a clutch and a brake device, both of which are situated along the shaft. A hub is supported on the shaft to allow relative rotation of the shaft within the hub, the hub having respective portions supporting an actuation coil of the clutch and a portion of the brake device. The brake device includes an electric brake actuator operable to set a variable brake force on the shaft, a screw-driven thrust member configured for actuation movable along an axis of the shaft by the electric brake actuator, and an axially floating rotor configured for rotation with the shaft. The axially floating rotor has a first axial side facing the screw-driven thrust member and providing a first braking surface for frictional contact therewith, and the axially floating rotor has a second axial side providing a second braking surface. A passive backing brake clamp of the brake device is positioned adjacent the second axial side of the axially floating rotor for frictional contact with the second braking surface thereof, and the axially floating rotor is biased away from the passive backing brake clamp by a first biasing member. Deflection of the first biasing member coupled with axial movement of the screw-driven thrust member and the axially floating rotor is configured to enable application of the braking force by pinching action of the axially floating rotor between the screw-driven thrust member and the passive backing brake clamp.

In yet another aspect, the invention provides a method of controlling a movable closure with a power closure actuator, an output member of which is coupled to drive movement of the movable closure. The movable closure is moved to an open position. A brake device situated along a shaft provided in the power closure actuator between the electric motor and the output member is operated, including: A) energizing an electric brake actuator to move an active brake clamp along an axis of the shaft toward and into contact with an axially floating rotor configured for rotation with the shaft, and B) energizing the electric brake actuator further to move both the active brake clamp and the axially floating rotor against a bias force from a first biasing member to establish contact between the axially floating rotor and a passive backing brake clamp, the axially floating rotor being pinched between the active brake clamp and the passive backing brake clamp to apply a brake force to the axially floating rotor and with it the shaft, the brake force being applied proportional to an amount of deflection in the first biasing member.

Other aspects of the invention will become apparent by consideration of the detailed description and accompanying drawings.

BRIEF DESCRIPTION OF THE DRAWINGS

FIGS. 3A to 3H illustrate a variety of exemplary vehicular installation applications for the power closure actuator of FIGS. 1 and 2, among other embodiments and variations thereof according to the present disclosure.

FIG. 4A is a schematic view of a compact rotary variation of the power closure actuator of FIGS. 1 to 2B.

FIG. 4B is a schematic view of an offset rotary variation of the power closure actuator of FIGS. 1 to 2B.

FIG. 4C is a schematic view of an inline rotary variation of the power closure actuator of FIGS. 1 to 2B.

FIG. 7A is a cross-sectional view of a brake device of the integrated brake-clutch unit of FIG. 6, the brake device being unactuated.

FIG. 7B is a cross-sectional view of the brake device of the integrated brake-clutch unit of FIG. 6, the brake device being in a first actuated state.

FIG. 7C is a cross-sectional view of the brake device of the integrated brake-clutch unit of FIG. 6, the brake device being in a second actuated state.

DETAILED DESCRIPTION

Before any embodiments of the present invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
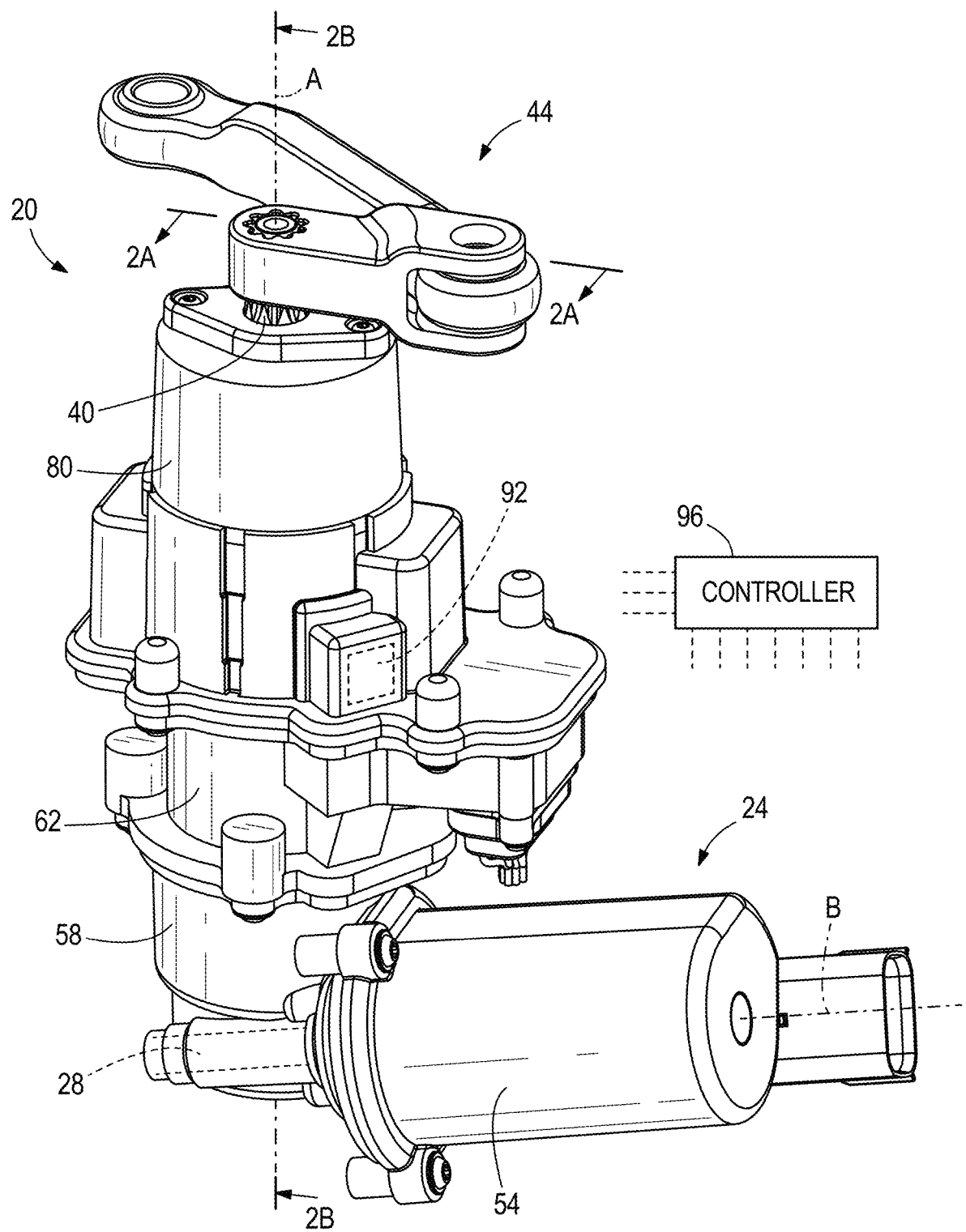
FIG. 1 is a perspective view of a power closure actuator according to one embodiment of the disclosure.
Figure 2A:
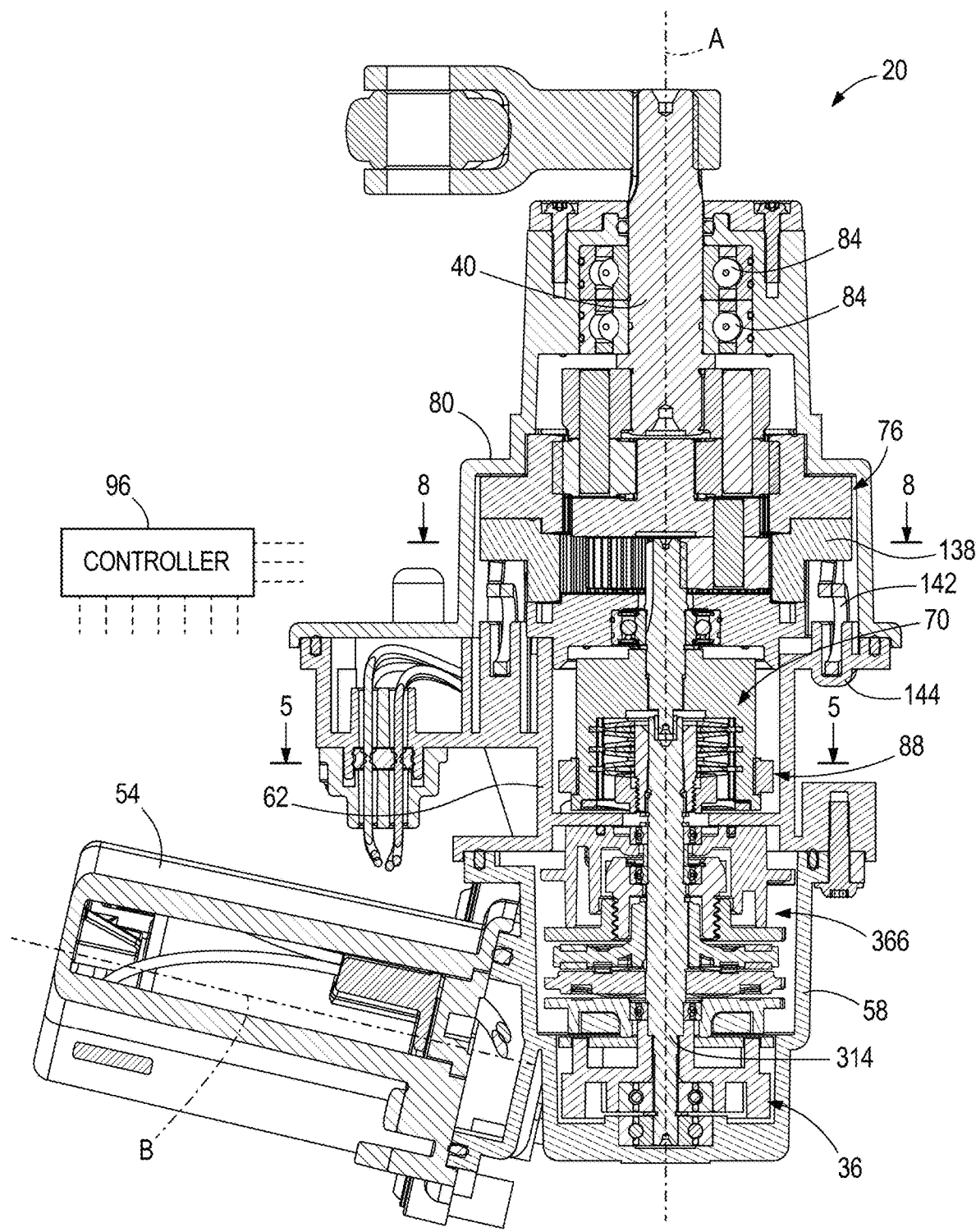
FIG. 2A is a cross-sectional view of the power closure actuator, taken along line 2A-2A of FIG. 1.
Figure 2B:
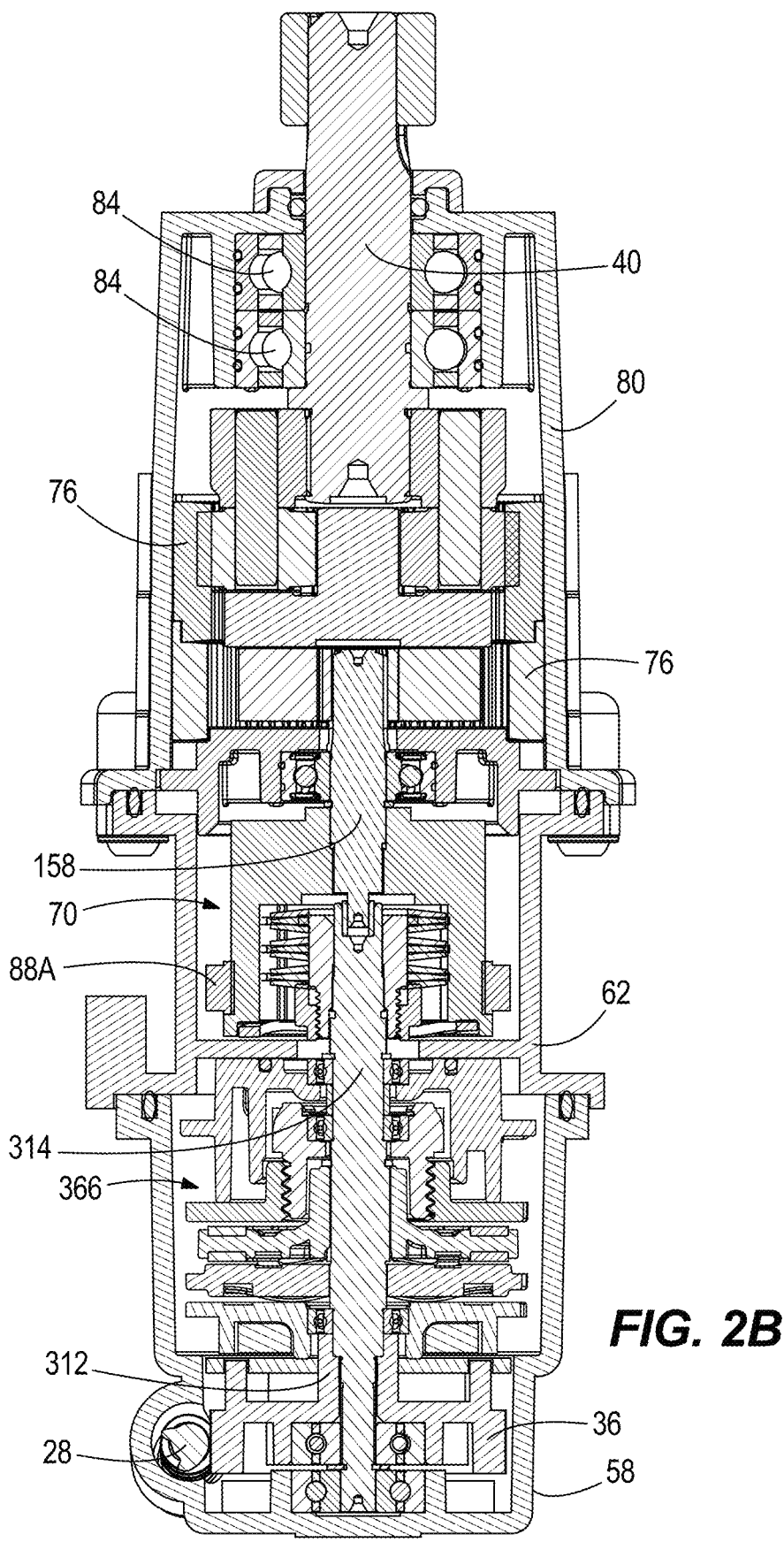
FIG. 2B is a cross-sectional view of the power closure actuator, taken along line 2B-2B of FIG. 1.

FIGS. 1 to 2B illustrate a power closure actuator, or simply, "actuator 20" which may be actuated to produce forces applied as opening and/or closing forces for selectively opening and/or closing a power closure such as a vehicle closure (e.g., a vehicle entry door, hatch, tailgate or end gate, decklid or trunk, and the like). The actuator 20 includes an electric motor 24 having an output shaft, which in the illustrated construction is embodied as a worm 28 operatively meshed with a worm gear 32 in a first gearbox 36. The first gearbox 36, along with several additional subassemblies as described further herein, forms part of a drivetrain between the motor 24 and an output shaft 40. The output shaft 40, which is one exemplary form of an actuator output member, defines a central axis A. The central axis A is shared with the remainder of the drivetrain, aside from the motor 24 and the worm 28. As shown in FIGS. 4A, 4B, and 4C, a variety of constructions are optional for the overall arrangement of the actuator 20, while maintaining the features and advantages of the actuator 20 according to the illustrated embodiment of FIGS. 1 to 2B. In the variation of FIG. 4B, the central axis is broken into two parallel axes A, A' with a connecting drivetrain 75 between the components on the respective axes (e.g., additional transfer gears, belt, chain, etc.). FIG. 4C illustrates a construction in which the motor 24 that acts as the seminal drive source of the actuator 20 is arranged with its axis along the same axis as a brake-clutch unit 366, the output shaft 40, and the other components therebetween. Thus, aspects of the present disclosure may be adapted to various package sizes and shapes as necessary to meet the needs of a particular closure application. A linkage 44 is secured to the output shaft 40 and operable by rotation of the output shaft 40 to perform an opening and/or closing articulation. In the event that the actuator 20 is supported to move with the closure, the linkage 44 can be secured to the vehicle body structure (e.g., door frame, truck bed, or pillar). However, in other constructions, the actuator 20 is fixed to the vehicle body structure and the linkage 44 is secured to the closure. The closure is selectively released from the vehicle body by a separate latching device (not illustrated), which can be powered or manually operable.

Figure 3A:
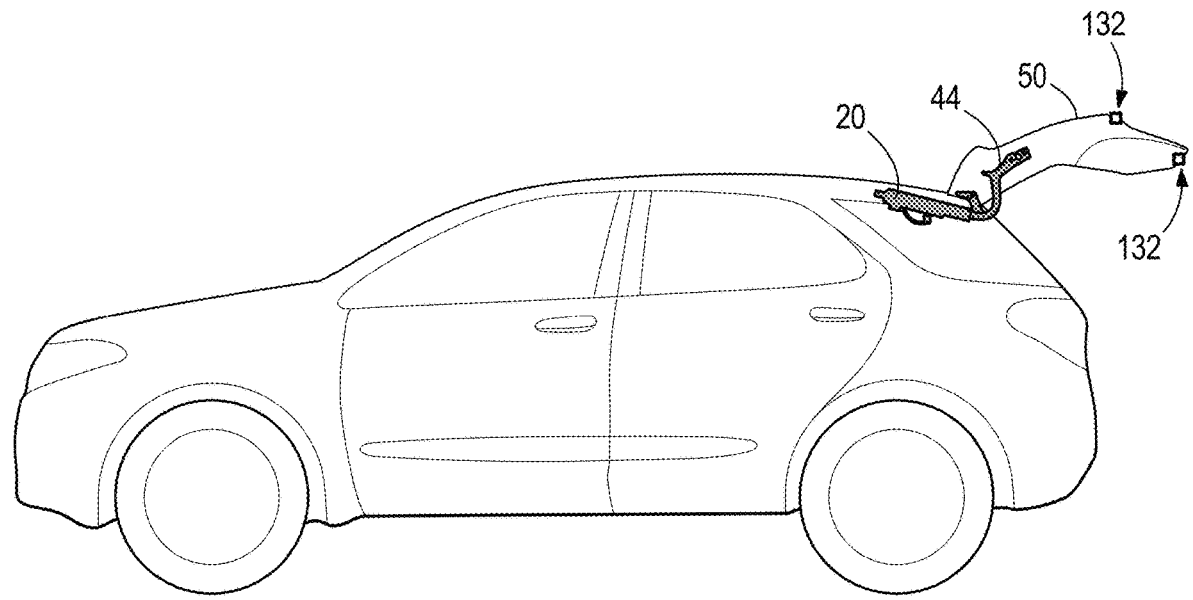
Figure 3B:
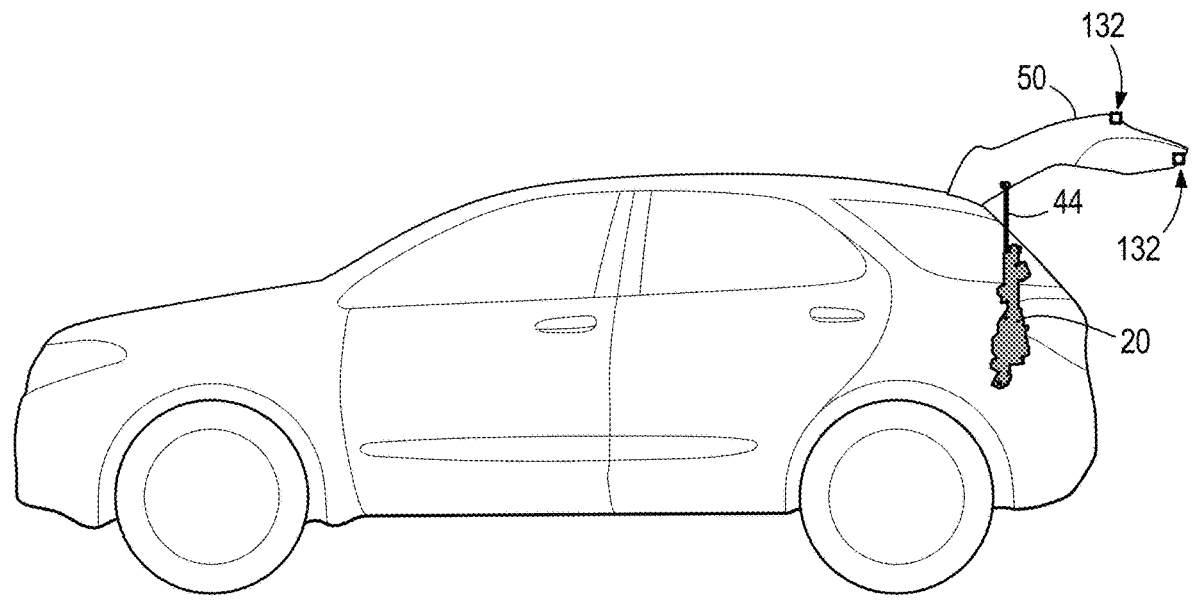
Figure 3D:
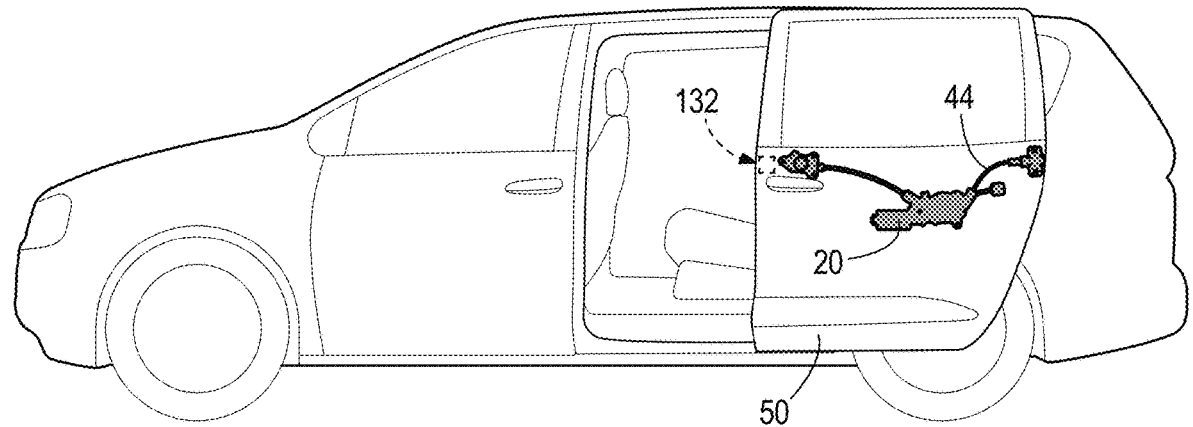
Figure 3E:
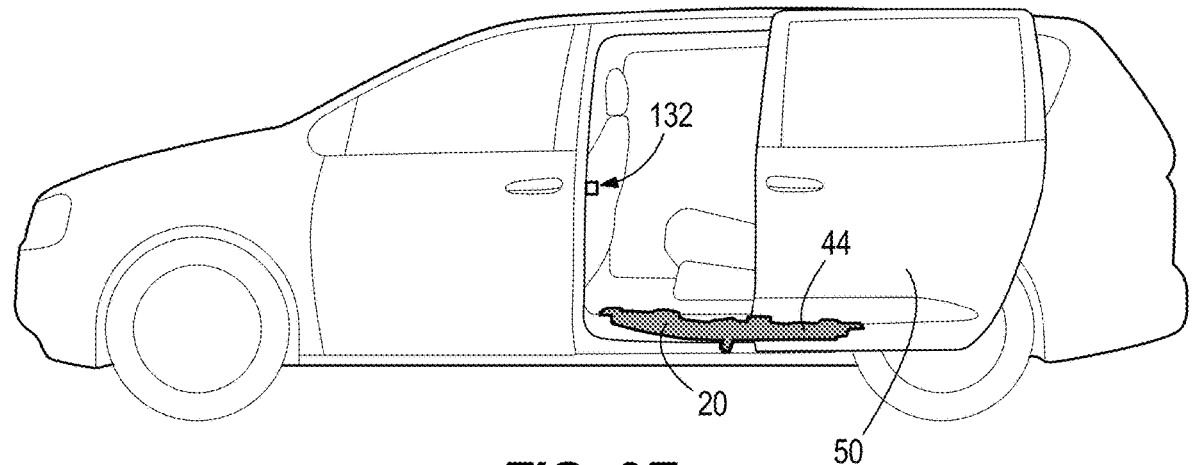
Figure 3F:
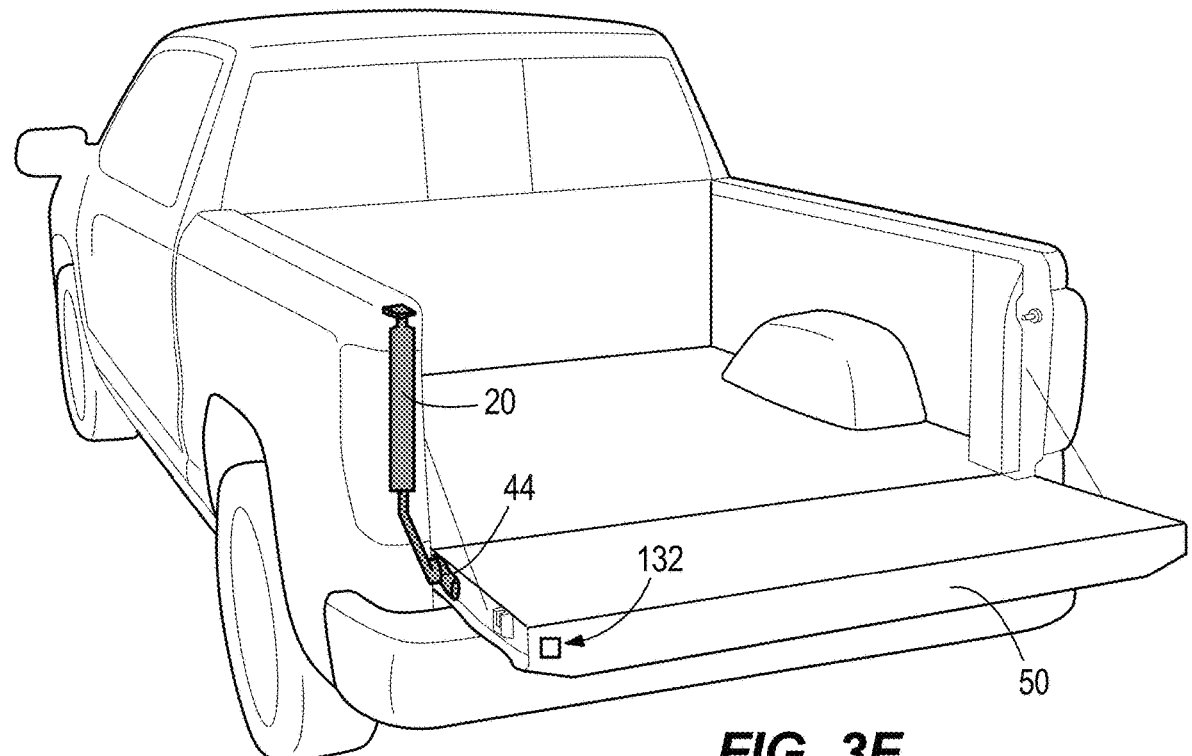
Figure 3G:
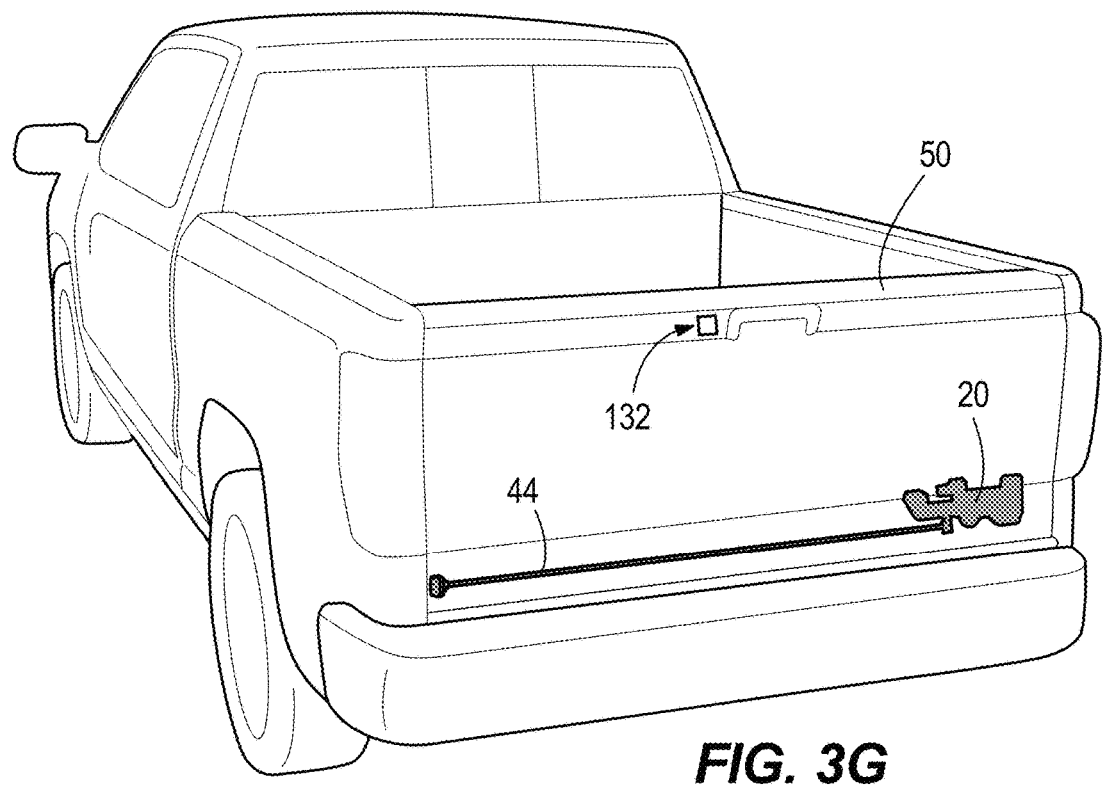
Figure 3H:
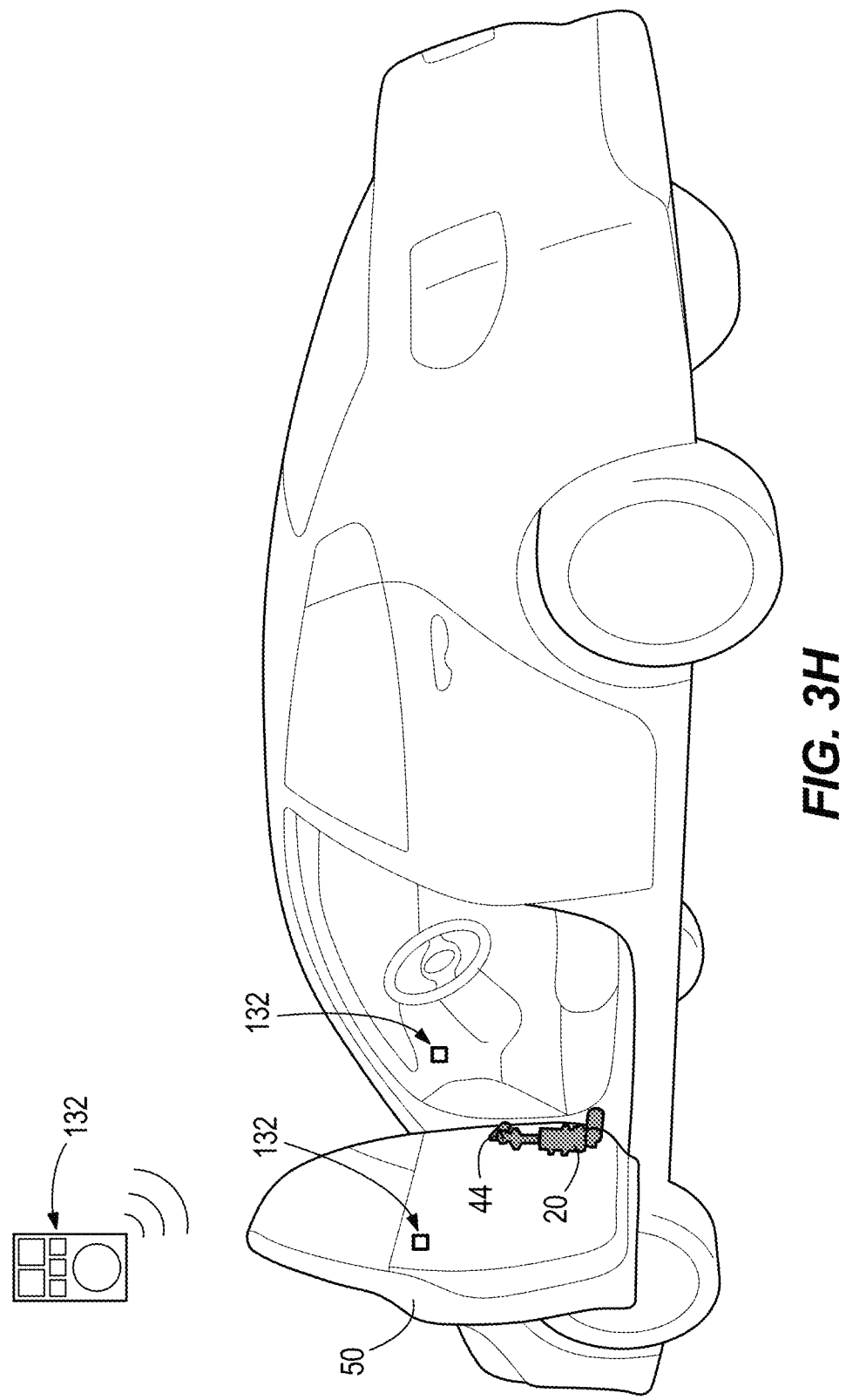

As illustrated in FIG. 3A, the actuator 20 is fixed to the vehicle body structure (e.g., roof) and the linkage 44 is secured to the closure 50, which is in the form of a liftgate. As illustrated in FIG. 3B, the actuator 20 is fixed to the vehicle body structure and the linkage 44 is secured to the closure 50, which is in the form of a liftgate. As illustrated in FIG. 3C, the actuator 20 is fixed to the closure 50, which is in the form of a liftgate, and the linkage 44 is secured to the vehicle body structure. As illustrated in FIG. 3D, the actuator 20 is fixed to the closure 50, which is in the form of a sliding side door, and the linkage 44 is secured to the vehicle body structure. As illustrated in FIG. 3E, the actuator 20 is fixed to the vehicle body structure (e.g., floor) and the linkage 44 is secured to the closure 50, which is in the form of a sliding side door. As illustrated in FIG. 3F, the actuator 20 is fixed to the vehicle body structure (e.g., truck bed) and the linkage 44 is secured to the closure 50, which is in the form of a tailgate. As illustrated in FIG. 3G, the actuator 20 is fixed to the closure 50, which is in the form of a tailgate, and the linkage 44 is secured to the vehicle body structure. As illustrated in FIG. 3H, the actuator 20 is fixed to the vehicle body structure and the linkage 44 is secured to the closure 50, which is in the form of a swinging side entry door, in particular a driver's side door.

Returning now to FIGS. 1 to 2B, the motor 24 of the actuator 20 defines a central axis of rotation B that is arranged at a skew angle with respect to the central axis A. A housing 54 of the motor 24 is secured to a first intermediate housing 58, also forming the housing of the first gearbox 36. The first intermediate housing 58 is in turn secured to a second intermediate housing 62 containing the brake-clutch unit 366 and a slip clutch 70. The second intermediate housing 62 is in turn secured to an output housing or cap 80, also forming the housing of a second gearbox 76. The various housings 54, 58, 62, 80 can be secured to each other in various ways, for example by interfacing flanges with a plurality of threaded fasteners. One or both of the first and second gearboxes 36, 76 can include a planetary gear set. The second intermediate housing 62 can have opposing axial ends sandwiched axially between the first intermediate housing 58 and the output housing 80. The output housing 80 surrounds a portion of the output shaft 40 and is secured to a distal end (opposite the motor 24) of the second intermediate housing 62 (e.g., with a plurality of threaded fasteners). Any or all of the housing attachments can be made by alternate means besides threaded fasteners, either in lieu of or in addition to threaded fasteners. The output shaft 40 is supported for rotation by one or multiple bearings 84, for example rolling element bearings, along its length. Additional sections of the drivetrain are supported for rotation by additional bearings in any or all of the aforementioned housings.

Figure 5:
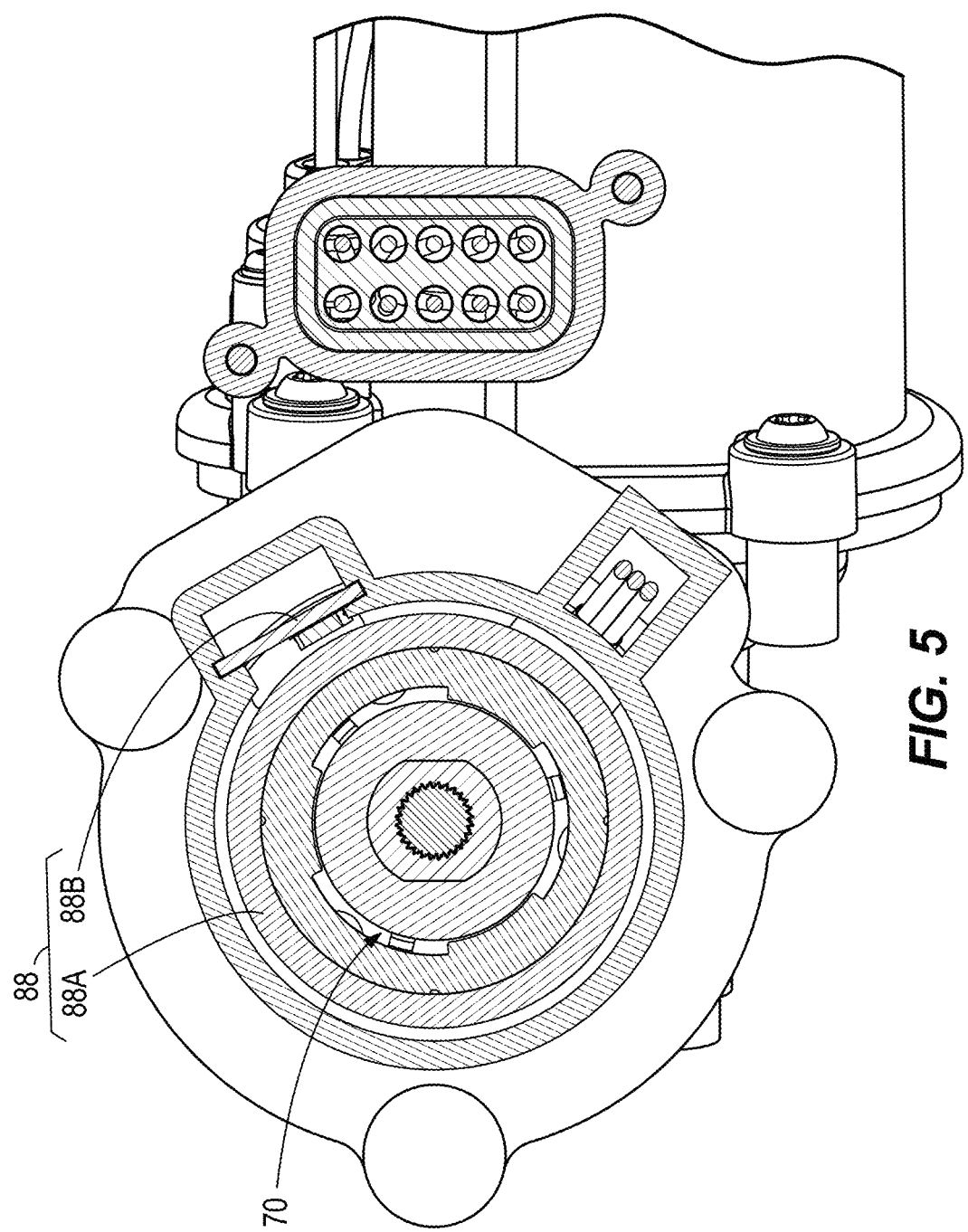
FIG. 5 is a cross-sectional view of the power closure actuator, taken along line 5-5 of FIG. 2A and illustrating a Hall Effect sensor assembly.

In general functional terms, the motor 24 provides input torque in a prescribed direction for opening or closing the closure 50 to one or more gear reduction stages (e.g., of the first gearbox 36), an output of which transmits an amplified torque (at reduced speed) to an input of the brake-clutch unit 366. The brake-clutch unit 366 controls whether or not a driving connection is established between the motor 24 and the output shaft 40, and more particularly between the first gearbox 36 and the slip clutch 70. As a separate function, the brake-clutch unit 366 also controls whether or not a braking force is applied on the drivetrain. More particularly, the brake-clutch unit 366 can set a braking force to one of a plurality of variable settings. Specific functions of the brake-clutch unit 366 are covered in further detail below with reference to FIGS. 7A to 7C. Regardless of the state of the brake-clutch unit 366, the slip clutch 70 provides a fully passive mechanism limiting abusive loads from being transmitted to the components of the drivetrain, including the motor 24 and the various gear reduction stages. The slip clutch 70 transmits torque only up to a prescribed torque threshold and automatically slips to break the continuity of the drivetrain above the prescribed torque threshold. The slip clutch 70 can take the form of the slip clutches disclosed in U.S. Pat. No. 11,421,465, the entire contents of which is incorporated by reference herein. As shown in the cross-section of FIG. 5, a magnet (e.g., magnet ring 88A) and Hall sensor 88B form a Hall sensor assembly 88 operable to detect rotational position change (e.g., on an output side of the slip clutch 70) of the drivetrain during operation. The Hall sensor assembly 88 is one example of a position sensor, although others may be appreciated as suitable replacements, that can detect position and/or speed of the output shaft 40 or other components of the drivetrain having a fixed relationship therewith (i.e., downstream of the brake-clutch unit 366 and the slip clutch 70). Additionally noted in FIG. 1 is the location of an operator force sensor 92, which is described in further detail below. The sensor 92 is incorporated into the drivetrain downstream of the slip clutch 70, for example within the second gearbox 76, although the operator force sensor 92 is located in other locations in alternate constructions. In a working closure application of the actuator 20 in which the actuator 20 operates to perform a power open and/or power close function for the closure 50, such a system additionally includes a controller 96 in signal communication with the motor 24, the brake-clutch unit 366, the Hall sensor assembly 88, and the operator force sensor 92. The controller 96 can be integrated into the actuator 20 or provided elsewhere within a vehicle. The controller 96, which can include a microprocessor and memory for storing executable instructions, can be implemented in whole or part as a vehicle body control module or may be in signal communication with a body control module.

Through the brake-clutch unit 366, the actuator 20 can exhibit at least three distinct drivetrain states including: drive, neutral (or "freewheel"), and brake as shown in FIGS. 7A to 7C. In the drive state, input and output sides of the brake-clutch unit 366 are connected for driving. Transitions between different states involves actuating one or both of two separate internal actuators of the brake-clutch unit 366. In the illustrated construction, the first actuator is an electric motor 304, and the second actuator is an electromagnetic clutch coil 308. As can be appreciated from the following description, the brake-clutch unit 366 can be maintained in multiple different states passively without any supply of power and this can include holding the output shaft 40, and thus the closure 50, fixed in a given position by brake actuation. Thus, the brake-clutch unit 366, along with the controller 96, enables an infinite check/stop and hold feature for the closure 50 in any position throughout the movement range of the closure 50, rather than relying on fixed-position detents (e.g., typical door detents used to hold a vehicle entry door in one of a few preselected positions). The passive nature of the brake-clutch unit brake avoids electrical power drain (e.g., from a main vehicle battery that powers the actuator 20) in the event the operator desires to leave the closure 50 in a partly or fully open state for a length of time (e.g., during loading/unloading). The brake of the brake-clutch unit 366 may also provide a stronger holding force than conventional door detents in some constructions such that the closure 50 is less likely to move from the desired position (e.g., by wind or other incidental forces). During times of powered output from the motor 24 to the output shaft 40 for power opening or power closing, the brake actuator 304 of the brake-clutch unit 366 is actuated to release the brake, and concurrent with the released brake, the clutch coil 308 is actuated to close/couple the clutch.

In use of the closure 50, for example on a vehicle, the vehicle operator may provide an input to a designated input device 132, for example a mechanical sensor (e.g., button, switch, dial, etc. either integrated with or separate from a handle on the closure 50) or a touch sensor (e.g., a touch pad or touch screen having resistive or capacitive sensing). The operator input device 132 can be one of a plurality of operator input devices 132, and the operator input device(s) can be positioned on the closure 50, on the vehicle body, on a control panel of the vehicle interior, and/or on a vehicle key fob having a wireless connection to the vehicle. Example operator input devices 132 are shown throughout FIGS. 3A to 3H. The input can be received by the controller 96, for example, via one or more signals from any one of the above-mentioned input devices, and in response the controller 96 can signal the release of the brake of the brake-clutch unit 366. Depending on the controller logic and/or the type of input from the operator, the brake-clutch unit 366 can either remain in the neutral state, or further be actuated to establish the drive state by a signal from the controller 96 to power on the clutch coil 308. In addition to the operator input mechanisms described above, the actuator 20 can further be configured to respond (i.e., perform a change of state such as a change of state of the brake-clutch unit 366 and/or a change in motor operation such as speed and/or direction) to an operator force applied to the closure 50, in particular a pushing or pulling force in the opening or closing direction of the closure 50. However, enabling the actuator 20 via the controller 96 to make an appropriate determination for response is significantly challenged by the potentially diverse static conditions of the vehicle. In particular, a vehicle having the closure 50 cannot reasonably be expected to have use only in a flat or level orientation with respect to earth. Rather, normal use of the vehicle will typically include various states of pitch in which the front of the vehicle is higher or lower than the rear, and roll in which the left side of the vehicle is higher or lower than the right side. In the context of this application, pitch and roll do not refer to dynamic motion of the vehicle, but rather the static inclination of the vehicle having the vehicle closure 50, as considered with respect to earth.

To overcome the above-mentioned difficulties, the actuator 20 includes force sensing capability that enables the controller 96 to differentiate force on the closure 50 applied by an operator, i.e., a human user, from force on the closure 50 applied by gravitational forces on the closure 50 in the opening/closing direction of the closure 50 due to vehicle inclination. Thus, the response of the actuator 20 to user-applied force on the closure 50 is independent of vehicle inclination so as to provide consistent and repeatable effort for the user. The force sensing referred to above utilizes the operator force sensor 92 briefly introduced above with respect to FIG. 1. The operator force sensor 92 is an absolute position sensor. The operator force sensor 92 can take any suitable form, including those described and shown in U.S. Pat. No. 11,421,465, the entire contents of which is incorporated by reference herein. The sensor 92 provides an output is in communication with the controller 96 and operable to detect torque in the drivetrain resulting from applied force on the closure 50 (e.g., by a human user pushing or pulling on the closure 50). Gravitational force in the opening-closing direction of the closure 50 is also sensed, but the gravitational component is configured to be segregated and neglected so that uniformity can be provided in effort on the closure to achieve a prescribed response of the actuator 20. In other words, for a car door or other closure, its own weight will not add to or subtract from the needed operator effort to trigger the controller threshold for operating the actuator 20. The controller 96 may for example perform a time-based comparison of output signal(s) from the sensor 92 in order to identify an output signal change corresponding to the change in force or "force delta" applied from the closure 50 to the operator force sensor 92. The initial or static signal is categorized as gravitational force (if any) due to inclination, and this amount, which is either positive or negative due to its directional nature, is subtracted from a subsequent force measurement. In some constructions, the segregation of forces can be confirmed or accomplished via an inclinometer on board the vehicle and provided in communication with the controller 96. For example, if the controller 96 is programmed with an algorithm that takes into consideration a mass of the closure, then inclination data can be used to calculate a gravitational force that the closure imparts to the actuator 20 at the output shaft 40.

A prescribed response of the actuator 20 can be a release of the brake and/or release of the brake, coupling of the clutch, and actuation of the motor 24, and/or if the motor 24 is already operating, changing speeds of the motor 24, including stopping of the motor 24. In an example where the motor 24 is running, the controller 96, on the basis of the operator force sensor 92, may slow down the motor speed when operator force is applied to the closure 50 in a direction opposite the motor-driven direction and/or the controller 96, on the basis of the operator force sensor 92, may speed up the motor speed or transition to the neutral state of the drivetrain when operator force is applied to the closure 50 in the motor-driven direction. Although these operations are available for utilizing the operator force sensor 92, the controller logic may utilize less than all of these potential operations, or may use certain operations in conjunction with or as a back-up to another sensor or primary controller logic. For example, the actuator 20 can include a separate position sensor, rotary encoder or the like (e.g., the Hall sensor assembly 88) that enables the controller 96 to track the relationship between speed and electric current to the motor 24, and this speed/current relationship is utilized as the primary means to detect and respond to forces applied to the closure 50 during powered open/close operations by the motor 24.

Figure 6:
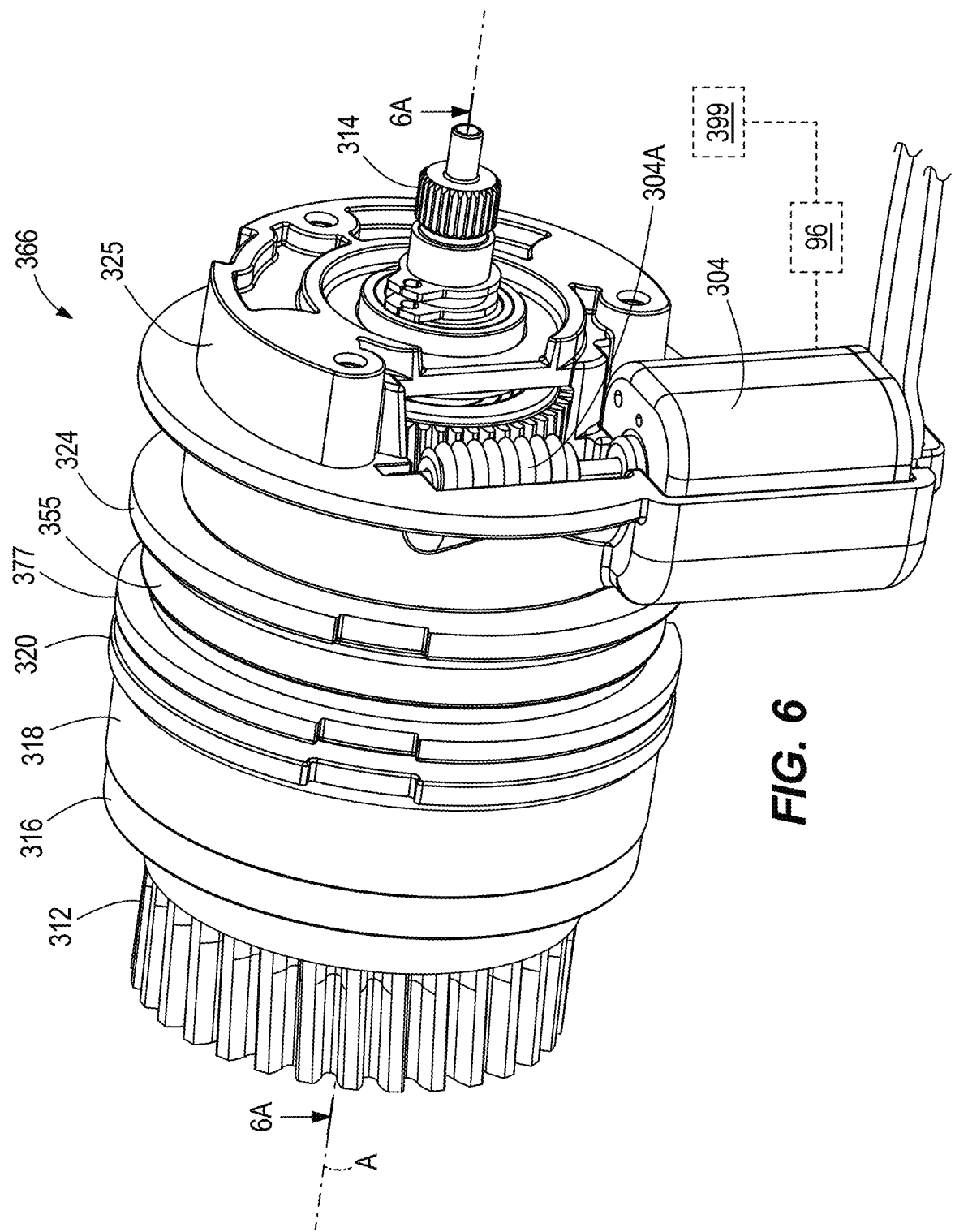
FIG. 6 is a perspective view of an integrated brake-clutch unit, removed from the power closure actuator of FIGS. 1 and 2.

The brake-clutch unit 366 of the powered actuator 20 is constructed according to the following non-limiting description, although variations are envisioned. Referring particularly to FIGS. 6 to 7C, an input member 312 and an output shaft 314 are concentrically arranged along the central axis A of the brake-clutch unit 366. The input member 312 can be formed as an axially extended portion of a gear of the gearbox 36. The input member 312 can be integral with the worm gear 32 as shown or separate and driven directly or indirectly from it. Although a portion of the output shaft 314 is received through the entire brake-clutch unit 366 and through a hollow portion of the input member 312, there is no driving connection directly from the input member 312 to the output shaft 314 (e.g., the input member 312 can be bearing-supported on a portion of the output shaft 314). A first clutch member, particularly clutch disc 316 or "friction disc," is secured to the input member 312 for rotation therewith. For example, an end portion of the input member 312 can be bonded, pinned, screwed, etc. together with the first clutch member 316—or simply connected for rotation with complementary non-circular profiles. The first clutch member 316, with the input member 312, is arranged to form one axial end of a body of the brake-clutch unit 366. A second clutch member 318 or "rotor," which may be referred to as the rotor disc or clutch ring, is fixed for rotation with the output shaft 314, e.g., by spline, key, bonding, etc. When energized, the clutch coil 308 is configured to pull the first clutch member 316, against the bias of the clutch spring 328, into engagement with the second clutch member 318. As illustrated, radially inner and outer portions of the second clutch member 318 can extend axially from an input side end wall toward the output end (right as shown) of the brake-clutch unit 366 to form a pocket or cavity. A hub 320 positioned on the output shaft 314 axially adjacent the second clutch member 318 is at least partially received in the pocket formed by the second clutch member 318. The hub 320 forms its own pocket or cavity that opens into that of the second clutch member 318. The clutch coil 308 is supported by the hub 320 and positioned within the pocket thereof. Radial clearance may be provided between the second clutch member 318 and the radially surrounding portion of the hub 320, although a direct rotational interface may be provided therebetween in other constructions.

The hub 320 is rotatably supported (e.g., by a rolling element bearing 330) on the output shaft 314 such that the hub 320 is rotatably separate from both the brake-clutch unit output (provided cooperatively by the output shaft 314 and the second clutch member 318) and the brake-clutch unit input (provided cooperatively by the input member 312 and the first clutch member 316). The hub 320 is a non-rotational component of the brake-clutch unit 366 and can be rotationally locked to the interior of the housing 58 (e.g., by castellations in the outer profile of the hub 320 that engage complementary shapes on the housing interior). The hub 320 is arranged to form an axial end of the clutch portion of the brake-clutch unit 366. The clutch is normally open or disengaged, for example by a clutch spring 328 that maintains separation between the first and second clutch members 316, 318. The clutch is closed or engaged by energization of the clutch coil 308 with electric current to attract the first clutch member 316 and axially pull it into frictional torque-transmitting engagement with the second clutch member 318. In other words, the clutch coil 308 is a clutch actuator powered to engage the clutch into a drive state. The first clutch member 316 may move alone, or with the input member 312 when the clutch is actuated. With the clutch actuated (engaged or closed), the output shaft 314 is connected with the input member 312 to be driven thereby. When the brake portion of the brake-clutch unit 366 is unactuated as shown in FIG. 7A, the brake provides no resistance or braking against the rotation of the output shaft 314.

Under circumstances that the controller 96 determines that the motor 24 is to drive the output shaft 40 through the brake-clutch unit 366 to perform a powered opening or powered closing of the closure 50, the brake is released (or left alone if already released) and concurrently the clutch coil 308 is energized to close/couple the clutch and achieve the drive state. This state of the brake-clutch unit 366 is maintained throughout operation of the motor 24 to perform the powered opening or the powered closing. Upon completion, the clutch may be automatically returned to the disengaged state by the controller 96 to avoid further power draw. Under circumstances that the controller 96 determines that the brake-clutch unit 366 is to be bypassed so that the closure 50 can be freely opened and closed by the user rather than under power of the motor 24, the brake actuator 304 is controlled to set the neutral, un-braked state of FIG. 7A. In the neutral state, a human operator can open and close the closure 50 without resistance of the actuator 20 (i.e., with the feel of a conventional un-powered closure). The neutral state requires no ongoing power draw, since the clutch is normally open, and the brake requires, if anything, a momentary power draw to set the desired state. The brake of the brake-clutch unit 366 is described in further detail below.

As mentioned above, the brake-clutch unit 366 has a brake actuator 304 in the form of an electric motor, and the motor includes a worm drive output 304A. A guide housing 325 supports the brake actuator 304, which is positioned away from the axis A in the illustrated construction. The guide housing 325 can be fixed with the housing 58 so as to prevent rotation. The brake-clutch unit 366 may be considered an integrated brake-clutch unit in that the brake and clutch portions or devices are mounted directly adjacent to one another along a common shaft (i.e., the output shaft 314). Additionally, elements of the brake and clutch can abut or contact one another. However, the brake and clutch devices of the brake-clutch unit 366 are not fully integrated in the sense that there is no rotor disc like the rotor discs 118, 218 of U.S. Pat. No. 11,421,465 that directly forms part of the selective brake coupling on one end and also part of the selective clutch coupling on its other end. Thus, it will certainly be appreciated that the brake device of the brake-clutch unit 366 can be provided in the powered actuator 20 or another device without being integrated with a clutch. In addition to ON/OFF brake settings that control whether or not the output shaft 314 is held fixed or left free to rotate, the brake of the brake-clutch unit 366 can also provide variable brake force settings as described below. The brake of the brake-clutch unit 366 is not biased to the brake-engaged state, but rather, stable in multiple positions even without the continued application of actuation force or energy. Thus, the brake-clutch unit 366 can have multiple at-rest states where the brake is left engaged or disengaged without continuous actuation of the brake actuator 304. Setting the brake force, or lack thereof, is accomplished by moving at least a first brake member 324 by actuation of the brake actuator 304 (e.g., through a screw member 335) in a one-way drive. In other words, the screw member 335 and brake actuator 304 are not back-drivable from forces on the first brake member 324.

Figure 6A:
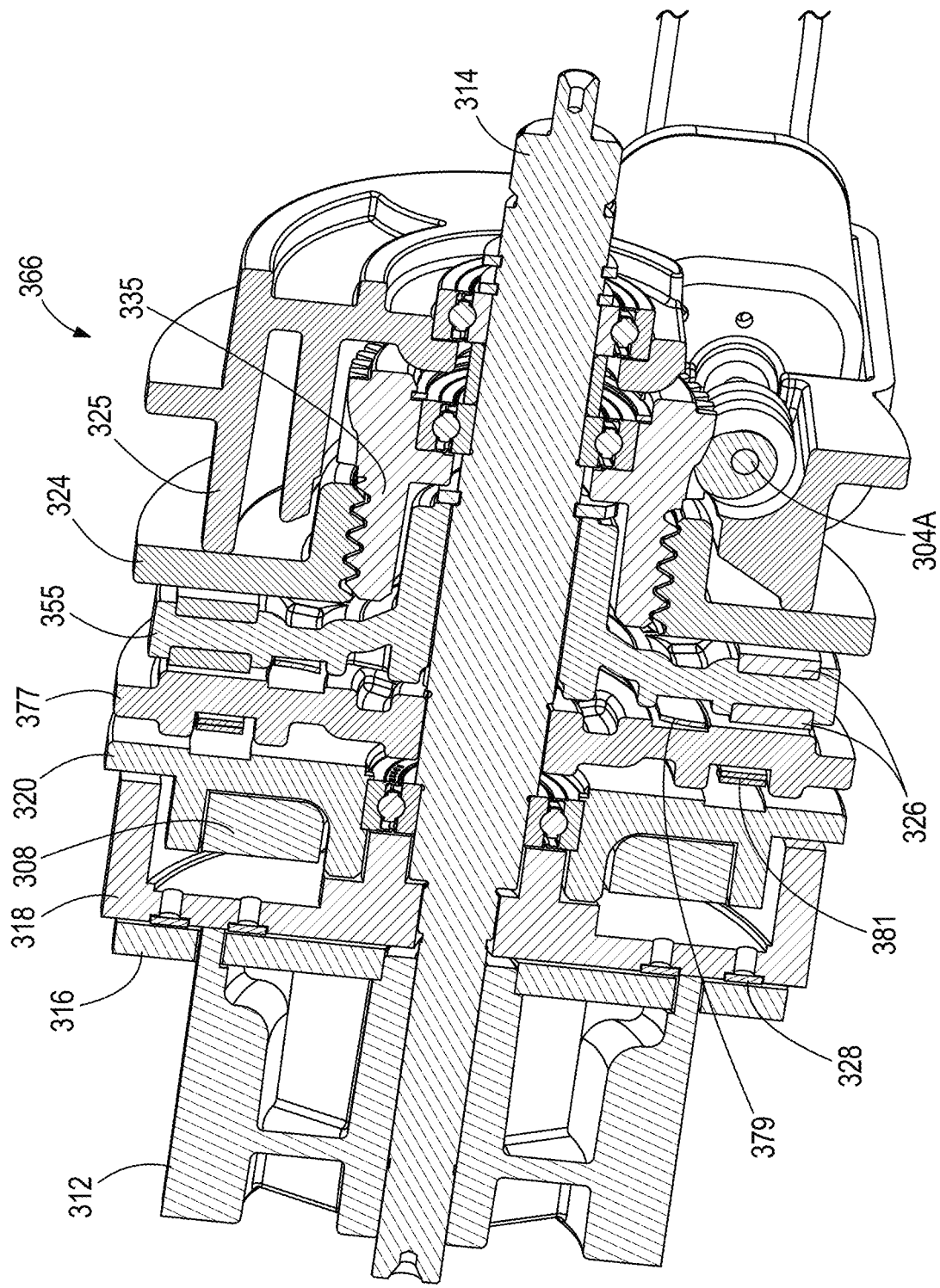
FIG. 6A is a cross-section view of the integrated brake-clutch unit of FIG. 6.

FIG. 6A illustrates the brake device of the brake-clutch unit 366 in greater detail. The first brake member 324 is arranged about and movable along the axis A. The first brake member 324 is referred to as the active brake member or clamp that is movable into and out of frictional contact with a second or central brake member 355. The axial force for braking of the second brake member 355 and thus the shaft 314 initiates with the first brake member 324, which may also be considered a thrust plate since it delivers the thrust in response to rotation of the screw member 335. The second brake member 355 is axially slidable along the output shaft 314 and is locked for rotation therewith (e.g., by splines). Due to its relationship to the output shaft 314 and being centrally located between the first brake member 324 and a third brake member 377, the second brake member 355 may be referred to as an axially floating rotor or disc of the brake device. The first and third brake members 324, 377 are limited to axial movements (e.g., by interfaces with the interior of the housing 58), while the axially floating rotor 355 is configured to rotate with the output shaft 314 with respect to the housing 58 when the brake is disengaged. The third brake member 377 may be referred to as the passive backing brake member or clamp. The axially floating rotor 355 is biased away from the third brake member 377 by a first biasing member 379 (e.g., wave spring(s)). The third brake member 377 is further biased away from the hub 320 by a second biasing member 381 (e.g., wave spring(s)). The biasing members 379, 381 are both configured to be engaged (e.g., stressed or deflected) during brake actuation. The second biasing member 381 can have a stiffer spring constant than the first biasing member 379 (e.g., thicker or stiffer material, or a greater number of stacked wave springs).

One or more friction members 326 are provided on both sides of the axially floating rotor 355 for selectively forming a friction braking interface with the active brake member 324 and the passive brake member 377, respectively. Friction members 326 can be overmolded on the axially floating rotor 355. In some embodiments, the friction member 326 are constructed of urethane. The friction members 326 can have a shore A hardness of 80. In some embodiments, the body of the axially floating rotor 355 that receives the friction members 326 is injection molded Grivory GF nylon. On the portions of the active brake member 324 and the passive brake member 377 directly facing the friction members 326 for interfacing therewith, the active brake member 324 and the backing brake member 377 can be provided with clamp surfaces. In some constructions, these surfaces can form smooth axially-raised pad surfaces that reduce nominal clearance to the axially floating rotor 355. The active brake member 324 and the backing brake member 377 can be formed (e.g., cast) of aluminum in some constructions.

The active brake member 324 is unbiased, and instead actuated by the screw member 335 such that rotation of the screw member 335 about the axis A, (e.g., driven by the worm drive output 304A through a gear portion of the screw member 335), drives the active brake member 324 which acts as a lead screw nut guided by the housing 58 and/or the guide housing 325. For example, the active brake member 324 can have a non-circular profile engaging with a non-circular profile of the housing 58 and/or the guide housing 325. Additionally, or alternatively, the active brake member 324 may be guided for axial movement by guide pins (not shown). The screw member 335 is rotatably supported on the output shaft 314 by one or more bearings. As mentioned above, the brake actuator 304 is not back-drivable from the active brake member 324 or the screw member 335 through the worm drive output 304A, thus a given brake setting will prevail even without continued energization of the brake actuator 304, following an actuation to the given brake setting (including a plurality of brake-engaged states). Reverse actuation of the brake actuator 304 causes reverse rotation of the screw member 335 and reverse axial movement of the active brake member 324 to partially or fully release the brake. As long as the clutch remains unactuated, a full brake release converts the brake-clutch unit 366 to the neutral or freewheel state, and no power draw is required by the brake-clutch unit 366. Under circumstances that the controller 96 determines that the brake-clutch unit 366 is to be bypassed so that the closure 50 can be freely opened and closed by the user rather than under power of the motor 24, the brake may need to be released from an active state to the neutral state. When such a brake release is required, only a momentary, rather than continuous, energization of the brake actuator 304 is needed. In order to use the power of the actuator 20 to operate an attached closure, a power coupling is established through the brake-clutch unit 366 by engaging the clutch portion thereof in accordance with the preceding disclosure.

FIGS. 7A to 7C illustrate multiple states of the brake device of the brake-clutch unit 366, including multiple brake-engaged states, any of which can be maintained without continuous energization of the brake actuator 304, once initially set. In FIG. 7A, the brake device is not engaged for braking. As such, the active brake member 324 remains in a position spaced axially from the axially floating rotor 355. The backing brake member 377 also remains nominally spaced from the axially floating rotor 355 and the hub 320 by the first and second biasing members 379, 381, respectively. In this state, the axially floating rotor 355 is unencumbered by frictional braking forces on the friction member 326, and the combination of the axially floating rotor 355 and the output shaft 314 are rendered rotatable about the axis A. With the focus on the function of the brake device of the brake-clutch unit 366, the clutch is not shown in the sequence of FIGS. 7A to 7C.

FIG. 7B illustrates a first brake-engaged state in which the active brake member 324 has been advanced by the screw member 335 to a degree sufficient not only to close the gap and contact the axially floating rotor 355, but also to overcome the first bias member 379 so that the axially floating rotor 355 becomes axially pinched or sandwiched between the active and backing brake members 324, 377. The braking on the axially floating rotor 355 simulates a caliper clamping on a disc brake, however, the axially floating rotor 355 is driven to move axially by the active brake member 324 in order for the backing brake member 377 to establish contact with the axially floating rotor 355. The first brake-engaged state of FIG. 7B can generally represent a low braking force applied to the axially floating rotor 355 and the output shaft 314 as compared to a second or relatively high braking force resulting from the second brake-engaged state of FIG. 7C. As compared to FIG. 7B, the active brake member 324 (and with it the axially floating rotor 355) is advanced a further axial distance by the screw member 335. The entire sandwich assembly of the three brake members 324, 355, 377 moves axially together as a unit against the bias of the second biasing member 381. The nominal axial clearance between the backing brake member 377 and the hub 320 can be partially or fully closed. As will be appreciated from the disclosure, the first and second brake-engaged states of the disclosed brake device are merely two finite brake force settings—of a virtually infinite possible set of brake force settings within the range of the device's capacity. For example, a brake force setting lower than the first setting of FIG. 7B can be achieved by advancing the active brake member 324 far enough to establish contact with the axially floating rotor 355, without completely overcoming the first biasing member 379, leaving a clearance between the axially floating rotor 355 and the backing brake member 377. Brake force is then applied proportional to an amount of deflection in the first biasing member 379. Likewise, brake force settings can vary in proportion to the amount of deflection of the second biasing member 381 to offer a further range of brake force settings—all of which involve pinching the axially floating rotor 355 from both sides.

Figure 8:
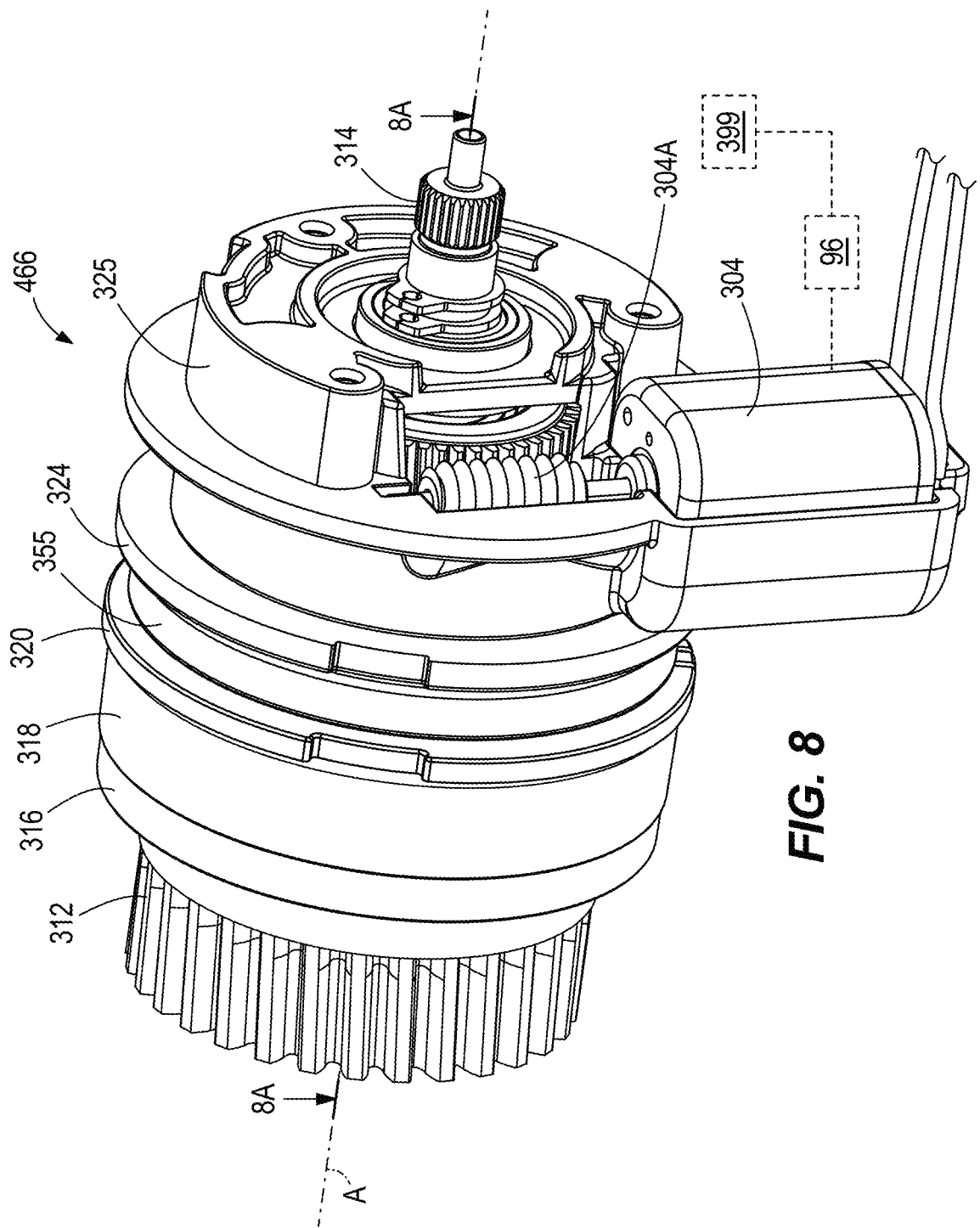
FIG. 8 is a perspective view of an integrated brake-clutch unit according to another embodiment of the present disclosure and useable within the power closure actuator of FIGS. 1 and 2.
Figure 8A:
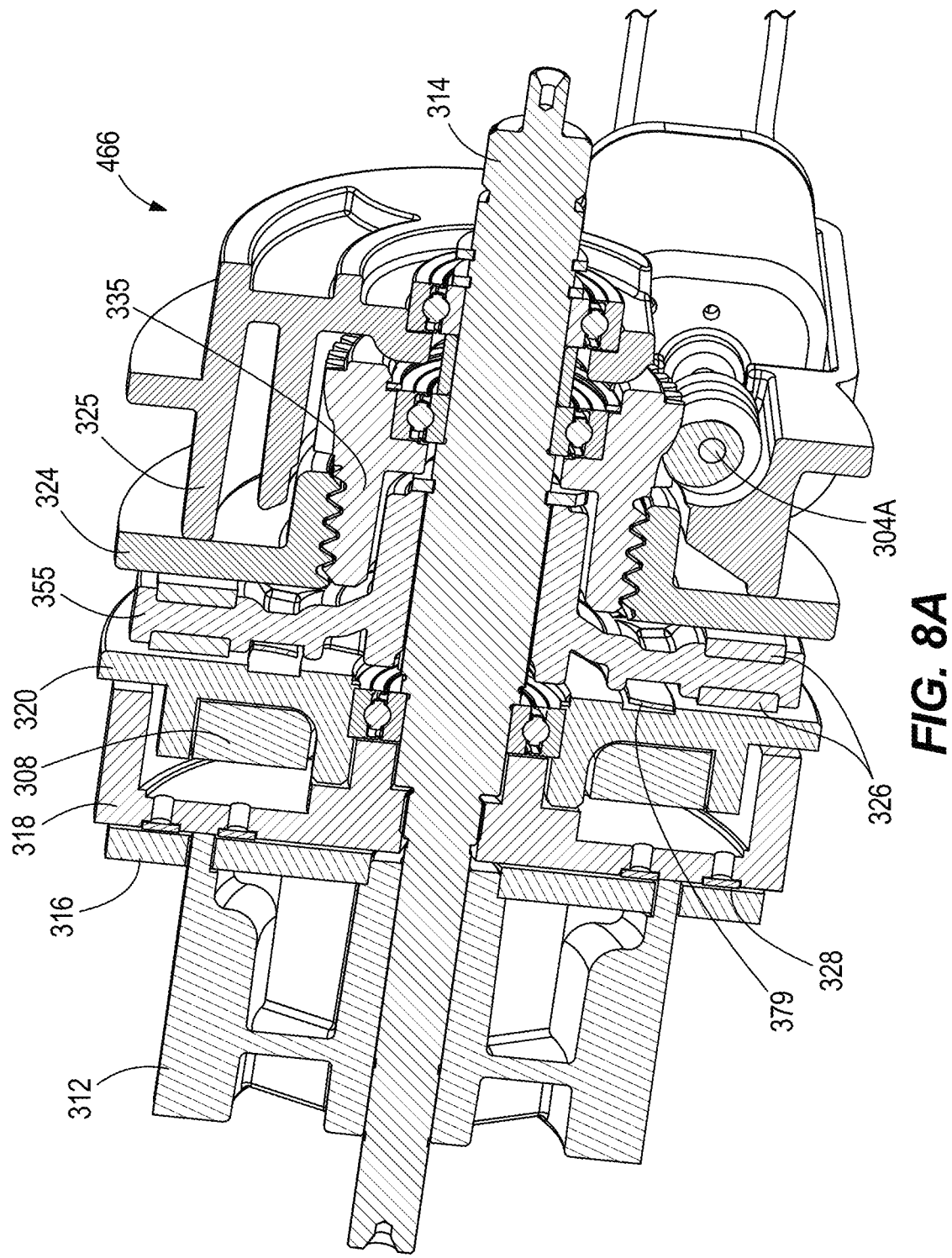
FIG. 8A is a cross-section view of the integrated brake-clutch unit of FIG. 8.
Figures 9A, 9B, 9C:
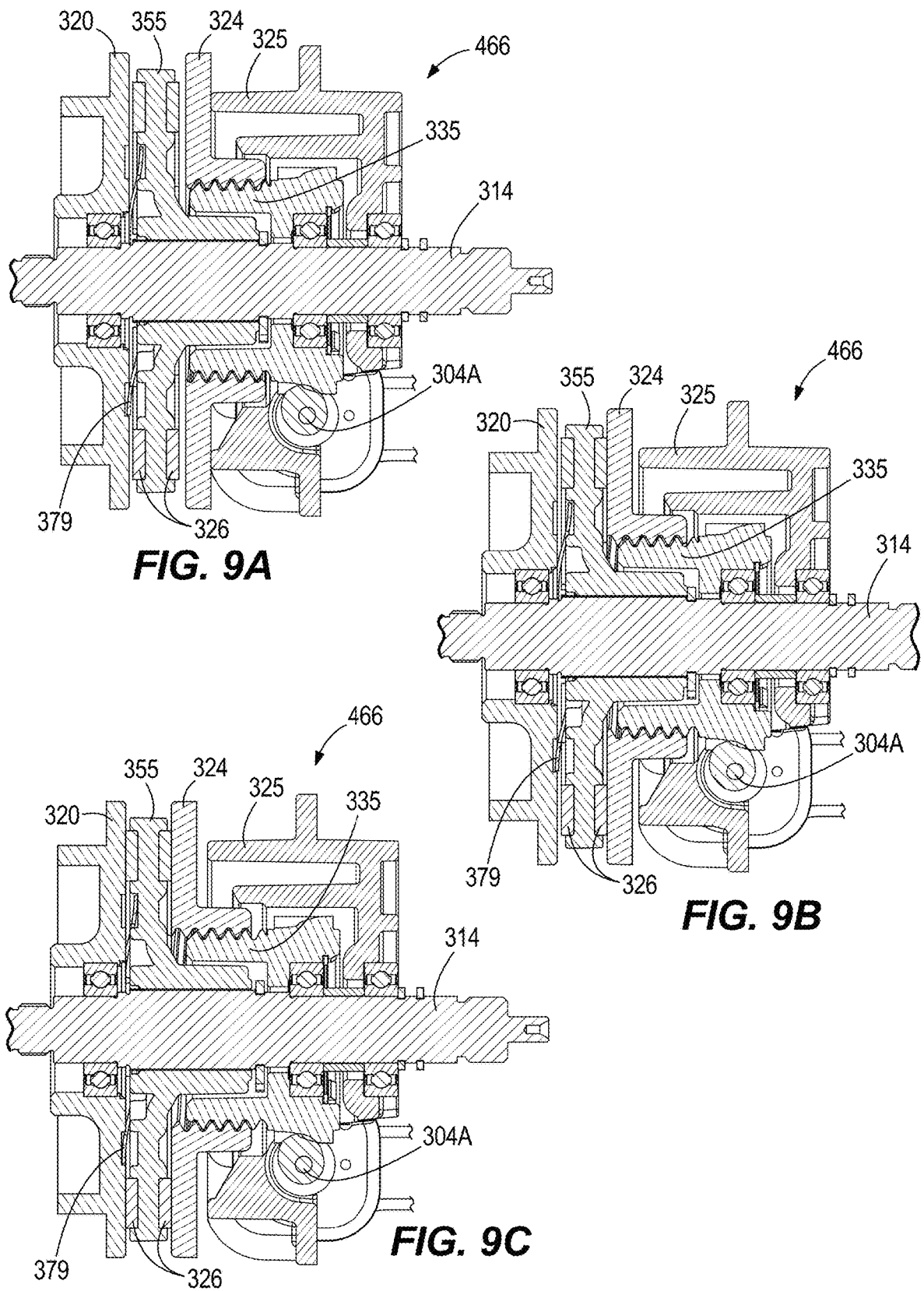
FIG. 9A is a cross-sectional view of a brake device of the integrated brake-clutch unit of FIG. 8, the brake device being unactuated.
FIG. 9B is a cross-sectional view of the brake device of the integrated brake-clutch unit of FIG. 8, the brake device being in a first actuated state.
FIG. 9C is a cross-sectional view of the brake device of the integrated brake-clutch unit of FIG. 8, the brake device being in a second actuated state.

FIG. 8 illustrates a brake-clutch unit 466 according to another embodiment. The brake-clutch unit 466 can be used in accordance with aspects of the preceding disclosure, e.g., in the context of the actuator 20. The brake-clutch unit 466 includes a brake device that is similar in nearly all respects to that of the brake-clutch unit 366, and for this reason, like parts are given like reference numerals. The brake device of FIG. 8 differs from that of FIG. 6 in that the backing brake member 377 is removed, along with the second biasing member 381 between the backing brake member 377 and the hub 320. As such, the axially floating rotor 355 is selectively braked by pinching action between the active brake member 324 and hub 320. As such, the hub 320 is provided with a clamp surface for engagement with one or more friction members 326 of the axially floating rotor 355. In other words, the hub 320 is the passive backing brake clamp of the brake device, although it may remain axially fixed with respect to the guide housing 325 and/or the housing 58 rather than axially movable like the backing brake member 377 of the preceding embodiment. FIG. 9A illustrates the brake device in a brake-disengaged state where axial clearance is provided between the friction members 326 and both the hub 320 and the active brake member 324. FIG. 9B illustrates a first brake-engaged state in which the active brake member 324 has been advanced by the screw member 335 to a degree sufficient to close the gap and contact the axially floating rotor 355. The bias member 379 can be only partially deflected so that the axially floating rotor 355 is not axially pinched between the active brake member 324 and the hub 320. The first brake-engaged state of FIG. 9B can generally represent a low braking force applied to the axially floating rotor 355 and the output shaft 314 as compared to a second or relatively high braking force resulting from the second brake-engaged state of FIG. 9C. As compared to FIG. 9B, the active brake member 324 (and with it the axially floating rotor 355) is advanced a further axial distance by the screw member 335. The assembly of the two brake members 324, 355 moves axially together as a unit against the bias of the biasing member 379. The nominal axial clearance between the axially floating rotor 355 and the hub 320 can be closed to a greater degree than FIG. 9B. The axially floating rotor 355 becomes axially pinched or sandwiched between the active brake member 324 and the hub 320. The braking on the axially floating rotor 355 simulates a caliper on a disc brake. As will be appreciated from the disclosure, the first and second brake-engaged states of the disclosed brake device are merely two finite brake force settings—of a virtually infinite possible set of brake force settings. Whereas the brake device of the preceding embodiment provides a variable range of pinched brake settings via the variable deflection of the second biasing member 381, the brake device of FIGS. 8 to 9C may be limited to providing a variable range of one-sided brake settings (contact of active brake member 324 to axially floating rotor 355 only) via the biasing member 379. The actuation of the brake device of FIGS. 6 to 7C culminates with maximum braking once the biasing member 379 is fully deflected to establish pinched braking of the axially floating rotor 355 between the active brake member 324 and the hub 320.

Figure 10:
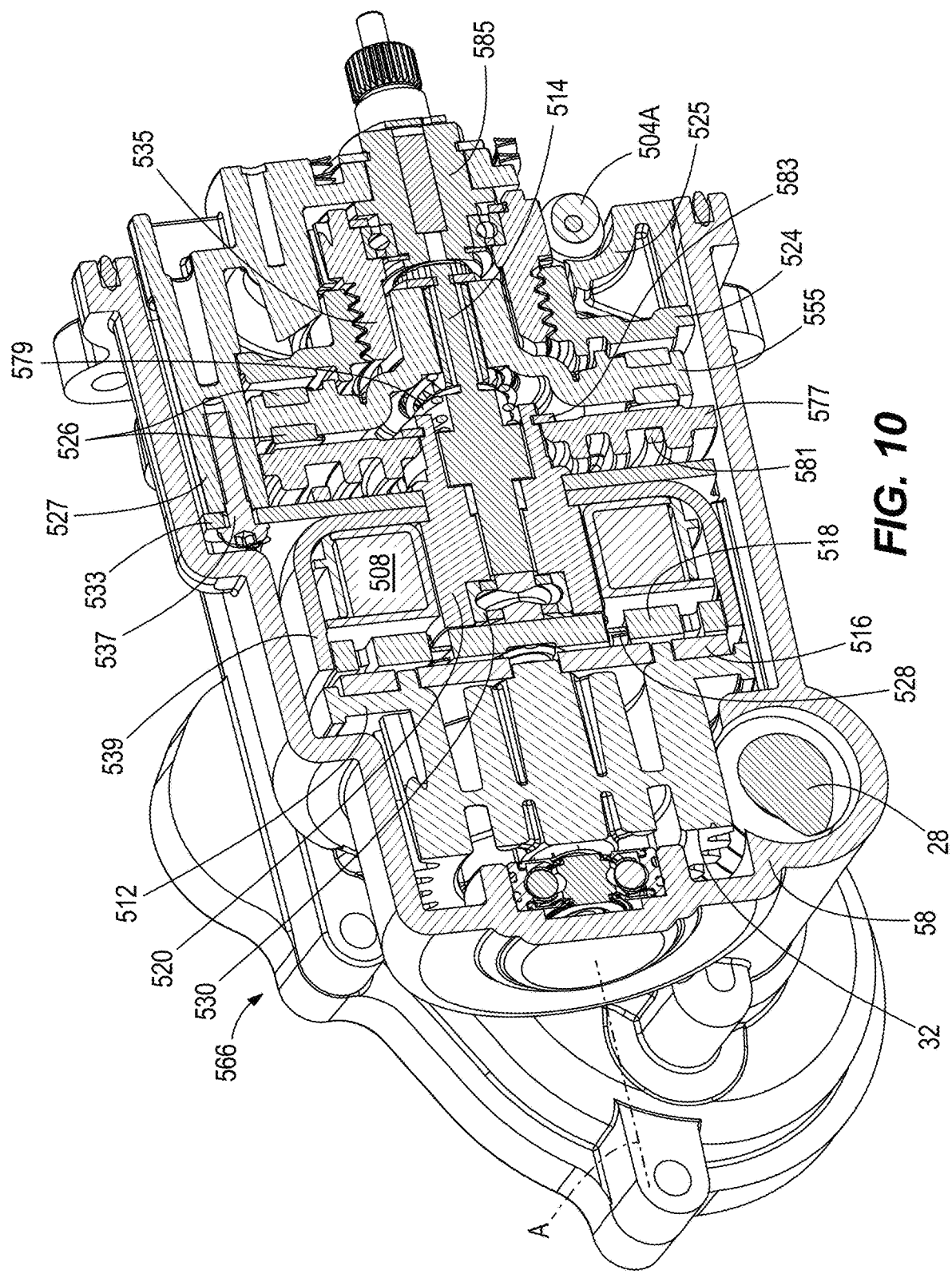
FIG. 10 is a cross-sectional view of an integrated brake-clutch unit according to another embodiment of the present disclosure and useable within the power closure actuator of FIGS. 1 and 2.

FIG. 10 illustrates a brake-clutch unit 566 according to another embodiment. The brake-clutch unit 566 can be used in accordance with aspects of the preceding disclosure, e.g., in the context of the actuator 20. The brake-clutch unit 566 includes clutch and brake devices that are similar in many respects to that of the brake-clutch unit 366, and for this reason, like parts are given like reference numerals, incremented by 200 and the above description is explicitly referenced for features not explicitly reiterated. The clutch of the brake-clutch unit 566 of FIG. 10 is situated axially between the input member 512 and the brake. The shaft 514 extends through the center of the brake-clutch unit 566, including the brake and clutch portions. The brake-clutch unit 566 is situated within the housing 58. Furthermore, an internal guide housing 525 is provided within the housing 58. The internal guide housing 525 can be secured to the housing 58, e.g., by adhesive and/or fasteners, etc. The internal guide housing 525 supports the brake actuator (e.g., motor having the worm drive output 504A), similar to the actuator 304. The internal guide housing 525 can have one or more radially outer portions 527 or "legs" that extend axially in the direction of the clutch and the input member 512. The legs 527 can be engaged with radially outer portions of the first brake member 524 (referred to as the active brake member or clamp) and the third brake member 577 (referred to as the passive backing brake member or clamp). A backplate or separator plate 533 is fixed to the legs 527 of the guide housing 525 (e.g., by screws 537). The backplate 533 provides an axially fixed reference and interface for the clutch and the brake. For example, the third brake member 577 is biased with the biasing member 581 (e.g., wave spring(s)) against the backplate 533. On the other side of the backplate 533, a clutch basket or housing 539 abuts the backplate 533. The clutch coil 508 is provided within the clutch housing 539. When energized, the clutch coil 508 is configured to pull a first clutch member 516 ("clutch disc" or "friction disc"), against the bias of the clutch spring 528, into engagement with a second clutch member 518 ("rotor"). The first clutch member 516 is fixed for rotation with the input member 512 (e.g., a non-circular profile of the input member 512 fits within a complementary non-circular profile of the first clutch member 516). The second clutch member 518 is fixed for rotation with the shaft 514 (e.g., by a swage on the shaft 514). When the coil 508 is energized to engage the clutch, the first clutch member 516 may axially slide along the non-circular profile of the input member 512. In other constructions, the input member 512 may move axially with the first clutch member 516 during clutch engagement.

The brake-clutch unit 566 includes a hub 520 that extends within portions of the brake and the clutch. The backplate 533 and the clutch housing 539 are secured to the hub 520 at a mid-portion thereof. In some constructions, as shown, the hub 520 can include a groove that accommodates radially inner portions of both the backplate 533 and the clutch housing 539. The backplate 533 and the clutch housing 539 can be pinched together and secured to the hub 520 (e.g., by a swage on the hub 520). The hub 520 is supported on the shaft 514 with one or more bearings 530 that enable free rotation of the shaft 514 within the hub 520. A first portion of the hub 520 extends within and supports the clutch coil 508. A second portion of the hub 520 extends within and supports the third brake member 577. The hub 520, together with the clutch housing 539, forms an annular pocket for receiving the clutch coil 508.

Between the first and third brake members 524, 577, the second brake member 555 is provided on the shaft 514—the second brake member 555 may be referred to as an axially floating rotor or disc of the brake device. Unlike the first and third brake members 524, 577 that are prevented from rotation about the central axis A by engagement with the guide housing 525, the second brake member 555 is fixed (e.g., splined) to the shaft 514 for rotation therewith. Like the second brake member 355 of the brake-clutch unit 366 of FIG. 6, the second brake member 555 includes friction members 526 on both axial sides for respective engagement with the first and third brake members 524, 577 when set for braking. The third brake member 577 can have a limited range of axial movement on the hub 520 and can be biased by the biasing member 581 to a fixed axial reference point near the end of the hub 520. For example, a retaining ring 583 can be provided to limit the position of the third brake member 577 and maintain a preload in the biasing member 581.

Unlike the brake-clutch unit 366 that has the biasing member 379 directly disposed between the second and third brake members 355, 377, the brake-clutch unit 566 includes a biasing member 579 (e.g., coil spring) that is disposed between the second brake member 555 and the end surface of an enlarged portion of the shaft 514. A portion of the biasing member 579 can be received within a central pocket or cavity of the second brake member 555. A secondary hub 585, spaced from the hub 520 and on an opposite side of the second brake member 555, can be provided within the guide housing 525 to support and separate the screw member 535 and the shaft 514. As with the prior embodiments, the screw member 535 is rotatable by the brake actuator (not shown) to set the brake position as released or various levels of actuated. Initial brake settings can establish friction contact between only the first and second brake members 524, 555, while further brake settings can fully clamp the second brake member 555 between the first and third brake members 524, 577. For the sake of brevity, reference is made to the above descriptions of brake operation within the actuator 20.

Although not depicted explicitly, a further embodiment is contemplated in which the brake-clutch unit 566 of FIG. 10 is modified by the removal of the third brake member 577, similar to the manner in which the brake-clutch unit 466 of FIG. 8 is modified from the brake clutch unit 366 of FIG. 6. In such an embodiment, the second brake member 555 can be driven by the first brake member 524 to selectively establish friction contact with the backing plate 533 (or another rotationally fixed component exposed to the second brake member 555, such as the clutch housing 539 or the hub 520).

As discussed briefly above, the brake devices disclosed herein are capable of being used in multiple ways, including a simple brake ON/OFF control, or a more sophisticated variable brake force control. In some constructions, a brake device as disclosed above can be used in the actuator 20 in conjunction with the operator force sensor 92 that sends a signal to the controller 96 based on torque detected in the drivetrain resulting from applied force on the closure 50 (e.g., by a human user pushing or pulling on the closure 50) with the effect that gravitational force in the opening-closing direction of the closure 50 is also sensed but segregated and neglected in responsive actions by the controller 96. In such constructions, the brake device may release the brake from an ON or engaged brake state to an OFF or released brake state in response to a prescribed operator force on the closure 50 (irrespective of the gravitational effect on the closure 50 due to vehicle inclination). The brake force for the ON state can be set by the controller 96 to a relatively high setting that is configured to hold the closure in place even when the vehicle is in a state severely angled from level. The controller 96 can use the same brake force ON setting, regardless of vehicle inclination. In other constructions, the controller 96 can set the brake force variably in relation to the detected vehicle inclination, even if the brake release is set to be controlled by the operator force sensor 92. In such constructions, variably setting the brake force can enable greater energy efficiency and faster response times for setting and releasing the brake, since the brake force is set progressively lower with vehicle orientations progressively closer to level. Variable brake force settings can be achieved through duty cycle variance in the control of the brake actuator 304.

In yet other constructions, the brake devices disclosed above are operable to provide variable brake force control to provide an incline-responsive stop-and-hold closure response, without any dedicated operator force sensor. In such constructions, the brake force value effected by the brake device can be set by variable control of the brake actuator 304 in relation to the vehicle inclination (e.g., detected by inclination sensor 399 and provided as an input to the controller 96). In other words, the controller 96 can be programmed to provide a command signal to the brake actuator 304 to apply the braking force, the value of which is based on an inclination of the vehicle. As described above, progressively more brake force is applied for progressively greater variance from level vehicle inclination. With no operator force sensor, the brake force can be set to a value that enables slip in the brake device (i.e., actual movement of the closure by the operator) to be used as the trigger for brake release. In some such constructions, the controller 96 sets the brake force as determined by the algorithm programmed therein to a suitable level (e.g., for holding the closure 50 in a particular open orientation, against gravitational force due to vehicle inclination). Thereafter, when the user applies force to move the closure 50, the brake force held in the brake device is overcome, leading to brake slippage. The slippage can be detected by a rotation sensor present in the actuator 20, such as the Hall sensor assembly 88, although this particular sensor assembly 88 is merely one example of a sensor configured to detect slippage of the brake device, which corresponds to rotation of the output shaft 40 and movement of the closure 50. The rotation sensor for detecting brake slippage according to this embodiment may take a number of other suitable constructions. Finally, it is also contemplated that the brake devices disclosed herein can be used in a simplified construction where the brake device is configured to provide simple ON/OFF brake operation (i.e., the brake force being set to a predetermined value for the ON setting, irrespective of vehicle inclination) in an actuator construction that lacks the designated operator force sensors 92.

Although some constructions may provide the controller 96 configured to calculate and direct a holding force from the brake device based on the measured inclination value, it is also conceived to have a predefined discrete number of brake force options that can be directed by the controller 96, responsive to inclination range detected by the inclination sensor 399. In some such constructions, the controller 96 can set the brake device to either a first "low" brake force value (i.e., for minor inclination not exceeding a threshold +/− angular deviation from level) or a second "high" brake force value (i.e., for major inclination exceeding the threshold +/− angular deviation from level). In yet other constructions, the controller 96 can be configured to direct the brake device for setting three (i.e., Low, Medium, and High) or more predetermined brake force values, based on the deviation from level inclination.

What is claimed is:

1. A power closure actuator for powering a movable closure, the power closure actuator comprising:
an output member configured to drive movement of the movable closure;
an electric motor coupled through at least one gear reduction stage to drive the output member;
a shaft situated between the electric motor and the output member, the shaft configured to selectively transmit power from the electric motor to the output member; and
a brake device situated along the shaft and configured for actuation via an electric brake actuator to apply braking force to the shaft, the brake device including
an active brake clamp movable along an axis of the shaft by the electric brake actuator,
an axially floating rotor configured for rotation with the shaft, the axially floating rotor having a first axial side facing the active brake clamp and providing a first braking surface for frictional contact therewith, and the axially floating rotor having a second axial side providing a second braking surface, and
a passive backing brake clamp positioned adjacent the second axial side of the axially floating rotor for frictional contact with the second braking surface thereof, wherein the axially floating rotor is biased away from the passive backing brake clamp by a first biasing member,
wherein deflection of the first biasing member coupled with axial movement of the active brake clamp and the axially floating rotor is configured to enable application of the braking force by pinching action of the axially floating rotor between the active brake clamp and the passive backing brake clamp.

2. The power closure actuator of claim 1, wherein the brake device forms part of an integrated brake-clutch unit including a clutch positioned along the shaft directly adjacent the brake device.

3. The power closure actuator of claim 2, wherein a hub is mounted on the shaft to allow relative rotation of the shaft within the hub, wherein the hub includes a first portion supporting an actuation coil of the clutch and a second portion supporting the passive backing brake clamp.

4. The power closure actuator of claim 1, wherein the passive backing brake clamp is axially movable along the shaft and biased toward the axially floating rotor by a second biasing member.

5. The power closure actuator of claim 4, wherein the second biasing member has a stiffer spring constant than the first biasing member.

6. The power closure actuator of claim 1, wherein the passive backing brake clamp is axially fixed along the shaft.

7. The power closure actuator of claim 1, wherein the active brake clamp is actuated through a non-back-drivable mechanism by the electric brake actuator such that the brake device is operable to hold the braking force in an absence of electrical power to the electric brake actuator.

8. A vehicle having the movable closure, the power closure actuator of claim 1, and a controller in communication therewith, the power closure actuator further comprising a sensor providing an output in the form of a signal to the controller indicative of force applied to the movable closure, wherein the controller is programmed to provide a command signal to the electric brake actuator to apply the braking force, the value of which is based on an inclination of the vehicle detected by an inclination sensor and provided to the controller.

9. The vehicle of claim 8, wherein the controller is programmed to release the brake upon detecting rotation of the shaft.

10. A vehicle having movable closure, the power closure actuator of claim 1, and a controller in communication therewith, the vehicle further comprising at least one operator input device in the form of a mechanical sensor or a touch sensor operable to provide a signal to the controller for controlling the electric motor and the electric brake actuator.

11. The vehicle of claim 10, wherein the at least one operator input device is/are positioned on one or more of: the closure, a body of the vehicle, a control panel within the vehicle, or a wireless key fob.

12. A power closure actuator for powering a movable closure, the power closure actuator comprising:
    an output member configured to drive movement of the movable closure;
    an electric motor coupled through at least one gear reduction stage to drive the output member;
    a shaft situated between the electric motor and the output member, the shaft configured to selectively transmit power from the electric motor to the output member;
    an integrated brake-clutch unit including a clutch and a brake device, both of which are situated along the shaft; and
    a hub supported on the shaft to allow relative rotation of the shaft within the hub, the hub having respective portions supporting an actuation coil of the clutch and a portion of the brake device,
    wherein the brake device includes
        an electric brake actuator operable to set a variable brake force on the shaft,
        a screw-driven thrust member movable along an axis of the shaft by the electric brake actuator,
        an axially floating rotor configured for rotation with the shaft, the axially floating rotor having a first axial side facing the screw-driven thrust member and providing a first braking surface for frictional contact therewith, and the axially floating rotor having a second axial side providing a second braking surface, and
        a passive backing brake clamp positioned adjacent the second axial side of the axially floating rotor for frictional contact with the second braking surface thereof, wherein the axially floating rotor is biased away from the passive backing brake clamp by a first biasing member,
    wherein deflection of the first biasing member coupled with axial movement of the screw-driven thrust member and the axially floating rotor is configured to enable application of the braking force by pinching action of the axially floating rotor between the screw-driven thrust member and the passive backing brake clamp.

13. The power closure actuator of claim 12, wherein the passive backing brake clamp is axially movable along the shaft and biased toward the axially floating rotor by a second biasing member.

14. The power closure actuator of claim 13, wherein the second biasing member has a stiffer spring constant than the first biasing member.

15. The power closure actuator of claim 12, wherein the passive backing brake clamp is axially fixed along the shaft.

16. The power closure actuator of claim 12, wherein the screw-driven thrust member is non-back-drivable mechanism such that the brake device is operable to hold the braking force in an absence of electrical power to the electric brake actuator.

17. A vehicle having the movable closure, the power closure actuator of claim 12, and a controller in communication therewith, the power closure actuator further comprising a sensor providing an output in the form of a signal to the controller indicative of force applied to the movable closure, wherein the controller is programmed to provide a command signal to the electric brake actuator to apply the braking force, the value of which is based on an inclination of the vehicle detected by an inclination sensor and provided to the controller.

18. The vehicle of claim 17, wherein the controller is programmed to release the brake upon detecting rotation of the shaft.

19. A vehicle having movable closure, the power closure actuator of claim 12, and a controller in communication therewith, the vehicle further comprising at least one operator input device in the form of a mechanical sensor or a touch sensor operable to provide a signal to the controller for controlling the electric motor and the electric brake actuator.

20. The vehicle of claim 19, wherein the at least one operator input device is/are positioned on one or more of: the closure, a body of the vehicle, a control panel within the vehicle, or a wireless key fob.

21. A method of controlling a movable closure with a power closure actuator that includes an electric motor and an output member coupled to drive movement of the movable closure, the method comprising:
    moving the movable closure to an open position; and
    operating a brake device situated along a shaft provided in the power closure actuator between the electric motor and the output member, wherein operating the brake device includes
        energizing an electric brake actuator to move an active brake clamp along an axis of the shaft toward and into contact with an axially floating rotor configured for rotation with the shaft, and
        energizing the electric brake actuator further to move both the active brake clamp and the axially floating rotor against a bias force from a first biasing member to establish contact between the axially floating rotor and a passive backing brake clamp, the axially floating rotor being pinched between the active brake clamp and the passive backing brake clamp to apply a brake force to the axially floating rotor and with it the shaft, the brake force being applied proportional to an amount of deflection in the first biasing member.

* * * * *